United States Patent
Youn et al.

(10) Patent No.: US 10,334,484 B2
(45) Date of Patent: Jun. 25, 2019

(54) METHOD FOR PROCESSING DATA WHEN LOSS OF ACCESS OCCURS IN A WIRELESS COMMUNICATION SYSTEM, AND DEVICE THEREFOR

(71) Applicant: LG ELECTRONICS INC., Seoul (KR)

(72) Inventors: Myungjune Youn, Seoul (KR); Hyunsook Kim, Seoul (KR); Jinsook Ryu, Seoul (KR); Laeyoung Kim, Seoul (KR); Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/554,282

(22) PCT Filed: Mar. 15, 2016

(86) PCT No.: PCT/KR2016/002555
§ 371 (c)(1),
(2) Date: Aug. 29, 2017

(87) PCT Pub. No.: WO2016/148477
PCT Pub. Date: Sep. 22, 2016

(65) Prior Publication Data
US 2018/0049072 A1  Feb. 15, 2018

Related U.S. Application Data

(60) Provisional application No. 62/134,594, filed on Mar. 18, 2015, provisional application No. 62/157,463, filed on May 6, 2015.

(51) Int. Cl.
| | | |
|---|---|---|
| *H04W 36/14* | (2009.01) | |
| *H04W 36/00* | (2009.01) | |
| *H04W 36/30* | (2009.01) | |
| *H04W 88/14* | (2009.01) | |
| *H04L 12/861* | (2013.01) | |
| *H04W 28/02* | (2009.01) | |
| *H04W 40/36* | (2009.01) | |

(Continued)

(52) U.S. Cl.
CPC ......... *H04W 36/0027* (2013.01); *H04L 49/90* (2013.01); *H04W 28/0226* (2013.01);
(Continued)

(58) Field of Classification Search
CPC ............................. H04W 48/08; H04W 12/06
(Continued)

(56) References Cited

U.S. PATENT DOCUMENTS

| | | |
|---|---|---|
| 8,531,533 B2 | 9/2013 | Yokota |
| 8,965,357 B2 | 2/2015 | Dimou et al. |

(Continued)

FOREIGN PATENT DOCUMENTS

| | | |
|---|---|---|
| WO | 2014/129870 A1 | 8/2014 |
| WO | 2014/137169 A1 | 9/2014 |

OTHER PUBLICATIONS

CATT, "EAP based routing rules transmission via TWAN in SCM," S2-143029, SA WG2 Meeting #105, Oct. 8, 2014, Sapporo, Japan, 5 pages.

(Continued)

*Primary Examiner* — Iqbal Zaidi
(74) *Attorney, Agent, or Firm* — Dentons US LLP

(57) ABSTRACT

Disclosed is a method for processing data, wherein, according to the occurrence of a loss of access of a terminal operating by SCM or TSCM, a first network entity operating in a first network receives a request to transmit data of second network, and receives the data of the second network from a third network entity, and buffers the data until a routing rule is updated.

10 Claims, 22 Drawing Sheets

(51) Int. Cl.
*H04W 48/04* (2009.01)
*H04W 76/19* (2018.01)
*H04W 76/16* (2018.01)
*H04W 76/12* (2018.01)

(52) U.S. Cl.
CPC ... *H04W 28/0278* (2013.01); *H04W 36/0083* (2013.01); *H04W 40/36* (2013.01); *H04W 48/04* (2013.01); *H04W 76/16* (2018.02); *H04W 76/19* (2018.02); *H04W 88/14* (2013.01); *H04W 36/14* (2013.01); *H04W 36/305* (2018.08); *H04W 76/12* (2018.02)

(58) Field of Classification Search
USPC .................................................. 370/252–339
See application file for complete search history.

(56) References Cited

U.S. PATENT DOCUMENTS

| 9,049,698 | B2 | 6/2015 | Johansson et al. |
| 2010/0035618 | A1 | 2/2010 | Sugiura et al. |
| 2014/0066074 | A1 | 3/2014 | Folke et al. |
| 2014/0376513 | A1 | 12/2014 | Poikselka |
| 2015/0282026 | A1* | 10/2015 | Gupta ................ H04W 72/042 370/331 |
| 2015/0327114 | A1 | 11/2015 | Gupta et al. |
| 2015/0341830 | A1 | 11/2015 | Jeong |
| 2016/0073247 | A1* | 3/2016 | Liu ..................... H04L 12/1403 455/406 |
| 2016/0295405 | A1* | 10/2016 | Roeland ................ H04W 12/04 |

OTHER PUBLICATIONS

Ericsson, "PCC aspects of UE-initiated NBIFOM, Routing Rule delivery and SCM," S2-150085, SA WG2 Meeting #107, Jan. 20, 2015, Sorrento, Italy, 10 pages.

LG Electronics, "Co-existence with RAN rule solution in case of loss of an access," S2-150230, SA WG2 Meeting #107, Jan. 20, 2015, Sorrento, Italy, 4 pages.

Huawei, et al., "Cleanup of the Solution of Loss of WLAN," S2-150099, SA WG2 Meeting #107, Jan. 20, 2015, Sorrento, Italy, 4 pages.

* cited by examiner (a)

(b)

METHOD FOR PROCESSING DATA WHEN LOSS OF ACCESS OCCURS IN A WIRELESS COMMUNICATION SYSTEM, AND DEVICE THEREFOR

This application is a 35 USC § 371 National Stage entry of International Application No. PCT/KR2016/002555 filed on Mar. 15, 2016, and claims priority to U.S. Provisional Application Nos. 62/134,594 filed on Mar. 18, 2015 and 62/157,463 filed on May 6, 2015, all of which are hereby incorporated by reference in their entireties as if fully set forth herein.

TECHNICAL FIELD

The present invention relates to a wireless communication system, and more particularly, to a method for processing data when access loss of a user equipment occurs and a device therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

An object of the present invention is to suggest a mechanism that efficiently processes access loss of a user equipment (UE) in a mobile communication system such as 3GPP or WLAN (Wireless Local Area Network).

Another object of the present invention is to stably deliver data to a UE by minimizing loss of the data transmitted to the UE when access loss of the UE occurs.

The technical problems solved by the present invention are not limited to the above technical problems and other technical problems which are not described herein will become apparent to those skilled in the art from the following description.

Technical Solution

A method for processing data by means of a first network entity to solve the technical problems comprises the steps of receiving information requesting the first network entity to deliver data of a second network to a UE from a third network entity as access loss of the UE operating by simultaneously accessing the first network and the second network occurs for the second network; receiving data transmitted to the UE by the second network entity of the second network from the third network entity; and buffering the data received from the third network entity until a routing rule of the UE is updated.

The may further comprise the step of receiving an indicator indicating that the routing rule has been completely updated, from the third network entity; and transmitting the data which are being buffered, to the UE as the indicator is received.

If the information is a request for generating a tunnel for delivery of the data of the second network, the data received from the third network entity may be received through the generated tunnel.

If the third network entity receives an index, which indicates a part of data completely transmitted to the UE, from the second network entity, the data received from the third network entity may correspond to data subsequent to the part indicated by the index among the data which are being buffered by the third network entity.

The first network may be a WLAN (Wireless Local Area Network), the second network may be a 3GPP network, the first network entity may be a TWAG (Trusted WLAN Access Gateway) operating on the first network, the second network entity may be an eNB (evolved Node B) operating on the second network, and the third network entity may be a PGW (Packet data network GateWay).

The data received from the third network entity may be data that may be subjected to handover to the first network, among the data transmitted to the UE by the second network entity.

A first network entity to solve the technical problems comprises a transmitter; a receiver; and a processor operating by being connected with the transmitter and the receiver, wherein the processor controls the receiver to receive information requesting the first network entity to deliver data of a second network to a UE from a third network entity as access loss of the UE operating by simultaneously accessing a first network and the second network occurs for the second network, controls the receiver to receive data transmitted to the UE by the second network entity of the second network from the third network entity, and buffers the data received from the third network entity until a routing rule of the UE is updated.

Advantageous Effects

As is apparent from the above description, the embodiments of the present invention have the following effects.

First of all, a procedure of processing access loss of a UE may be improved, whereby data transmitted to the UE may efficiently be delivered to the UE.

Secondly, data transmitted to the UE may stably be delivered to the UE without loss.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

BRIEF DESCRIPTION OF THE DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR CARRYING OUT THE INVENTION

Figure 1:
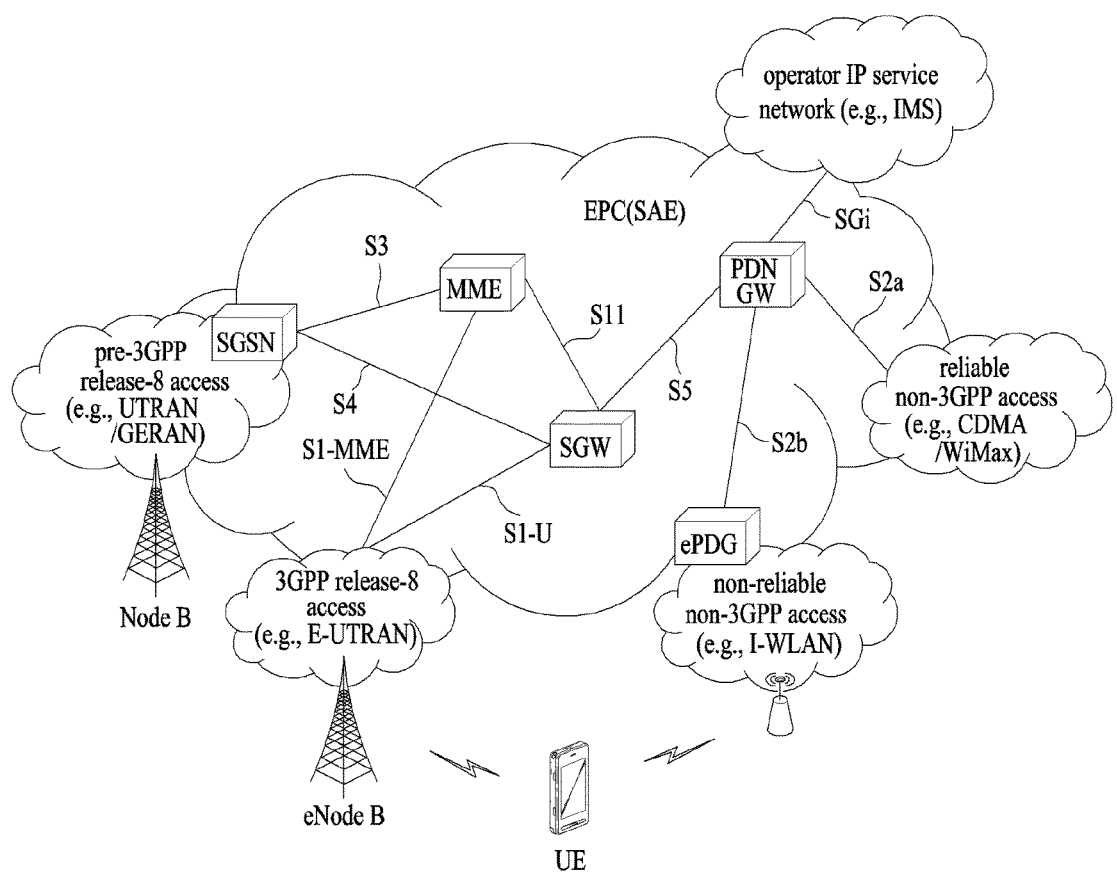
FIG. 1 is a diagram illustrating a brief structure of an evolved packet system (EPS) that includes an evolved packet core (EPC).

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of TS 23.161, TS 23.401, TS 23.402, TS 24.301, TS 24.302, TS 29.274, TS 36.300 and TS 36.331, which are the standard documents of the 3GPP system, and P802.16e-2004, P802.16e-2005, P802.16.1, P802.16p and P802.16.1b, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

ANDSF (Access Network Discovery and Selection Function): This is one of network entities for providing a policy for discovering and selecting an access that can be used by a UE on an operator basis.

ISRP (Inter-System Routing Policy): This is a protocol defined by the operator to indicate which one will be used by the UE for routing of IP traffic among several radio access interfaces. The ISRP may include three types of protocols as follows, as a policy for defining an access network preferred (i.e., having a high priority) or restricted to route/steer a packet service (or an IP flow or IP traffic or applications). That is, the ISRP may be divided into an IP flow mobility (IFOM) protocol, a multi access PDN connectivity (MAPCON) protocol, and a non-seamless WLAN offload (NSWO) protocol as follows.

IFOM (IP Flow Mobility) protocol: This protocol is in regards to a list in which access technologies/access networks are arranged according to a priority, when traffic matched to a specific IP traffic filter can be routed on a specific APN (Access Point Name) or on a random APN. Further, this protocol may designate for which radio access the traffic matched to the specific IP traffic filter is limited on the specific APN or on the random APN.

MAPCON (Multi Access PDN Connectivity) protocol: This protocol is a list in which the access technologies/access networks to be used by the UE are arranged according to the priority when a PDN connection for the specific APN can be routed. Further, this protocol may designate for which radio access a PDN connection to a specific APN will be limited.

NSWO(Non-seamless WLAN offload) protocol: This protocol designates whether certain traffic will be offloaded or not offloaded non-seamlessly to a WLAN.

ISMP (Inter-System Mobility Policy): This is a set of protocols defined by an operator to have an impact on an inter-system mobility decision made by the UE. When the UE can route IP traffic on a single radio access interface, the UE may use ISMP to select the most appropriate access technology type or access network in a given time.

RAN rule: This is a rule received from the network and is called RAN support information. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. Alternatively, when the RAN rule for moving the traffic to the 3GPP access is satisfied, the AS layer of the UE delivers a move-traffic-from-WLAN indication to the higher layer of the UE. 3GPP. 3GPP TS 23.401, TS 23.060, TS 23.402, TS 36.300, TS 36.304, TS 36.331, TS 25.304, and TS 25.331 may be incorporated herein for detailed descriptions on the RAN rule.

Local Operating Environment Information: This is a set of implementation specific parameters which describe the local environment in which the UE is operating.

Network-Based IP Flow Mobility (NBIFOM): This is IP flow mobility based on network based mobility protocol (GTP or PMIP).

UE-initiated NBIFOM: This is NBIFOM in which the UE initiates IP flow mobility.

Network-initiated NBIFOM: This is NBIFOM in which the network initiates IP flow mobility.

Multi-access PDN connection: This is a PDN connection in which traffic can be routed through the 3GPP access and/or the WLAN access. Each IP flow is routed only through one access at one instance.

Routing filter: This is a set of IP header parameter values/ranges of a packet flow used to identify IP flow for the purpose of routing.

Routing access type: This is a type of an access for routing a set of IP flows of PDN connection (3GPP access or WLAN access.

Routing Rule (RR): This is a set of information that enables association between the routing filter and the routing access type.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |

TABLE 1-continued

| Reference point | Description |
| --- | --- |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
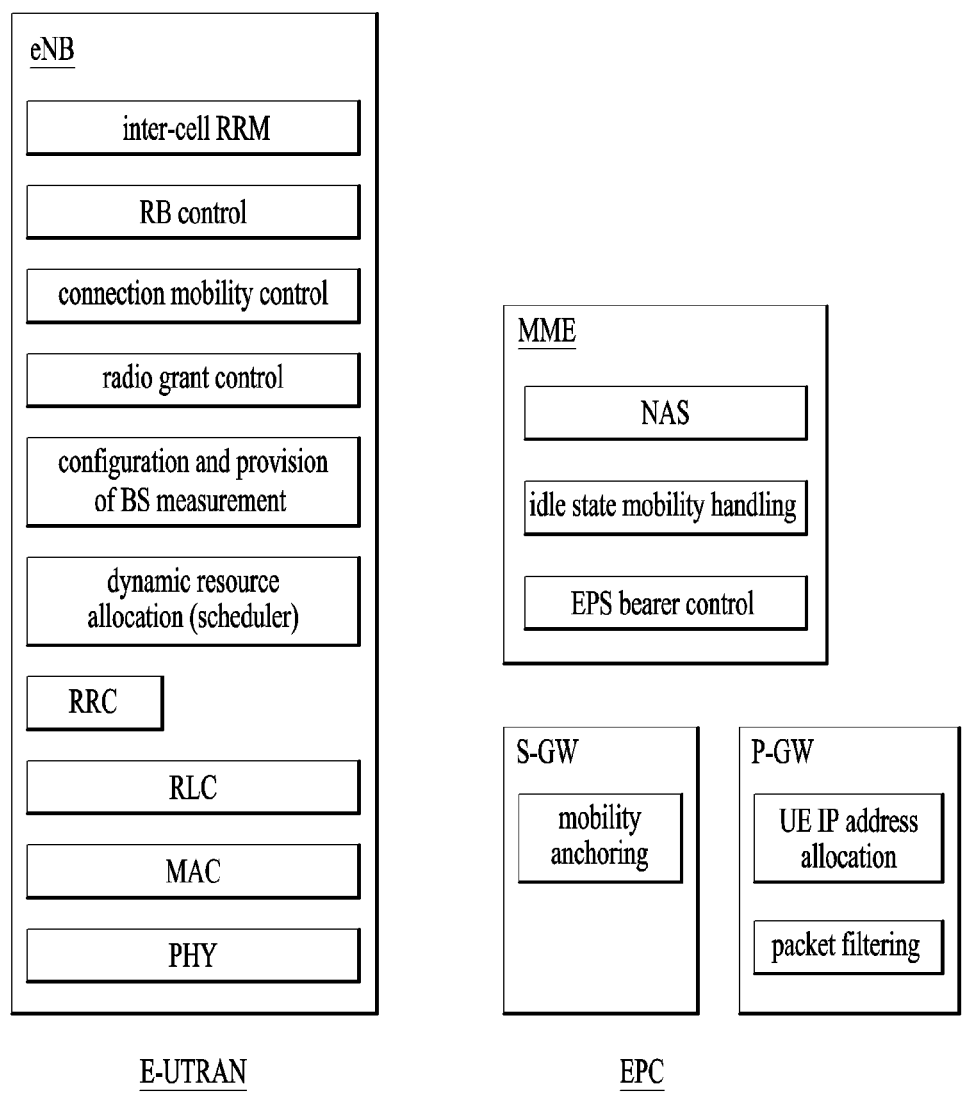
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
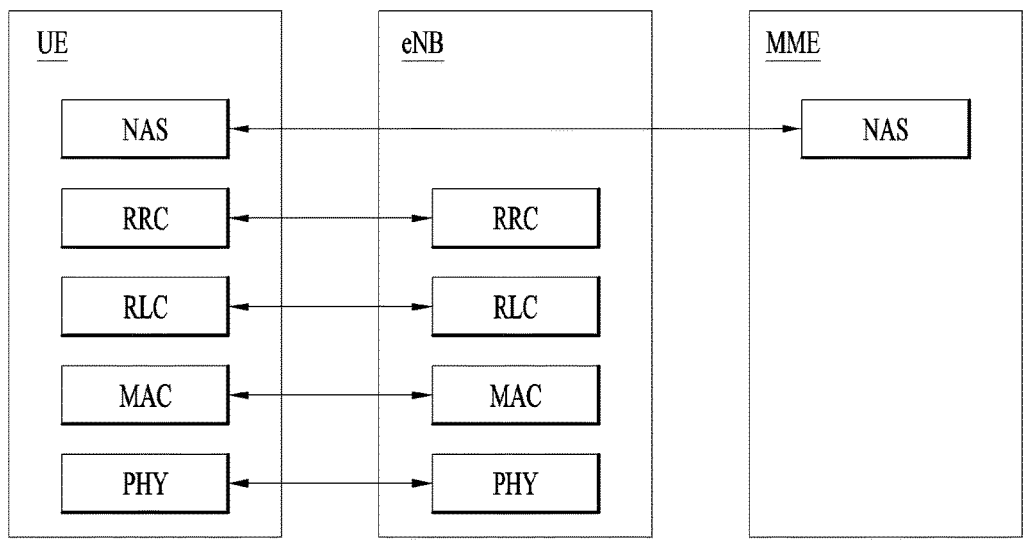
FIG. 3 is an exemplary diagram illustrating a structure of a radio interface protocol on a control plane.
Figure 4:
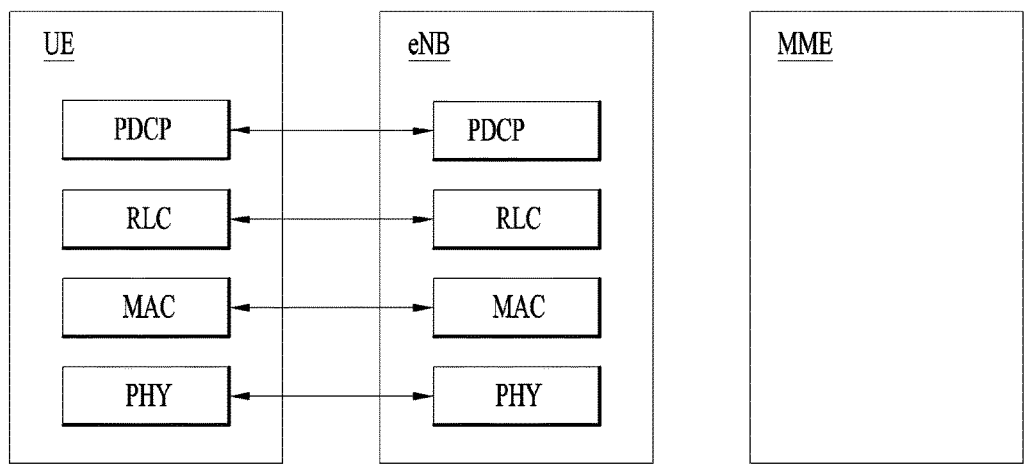
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
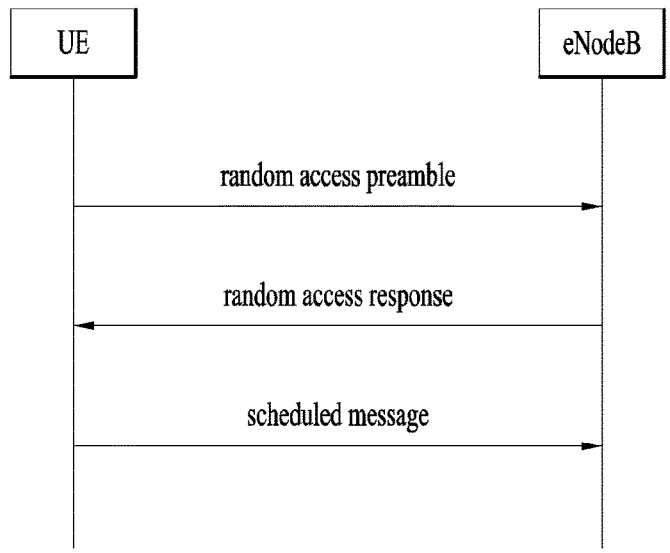
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
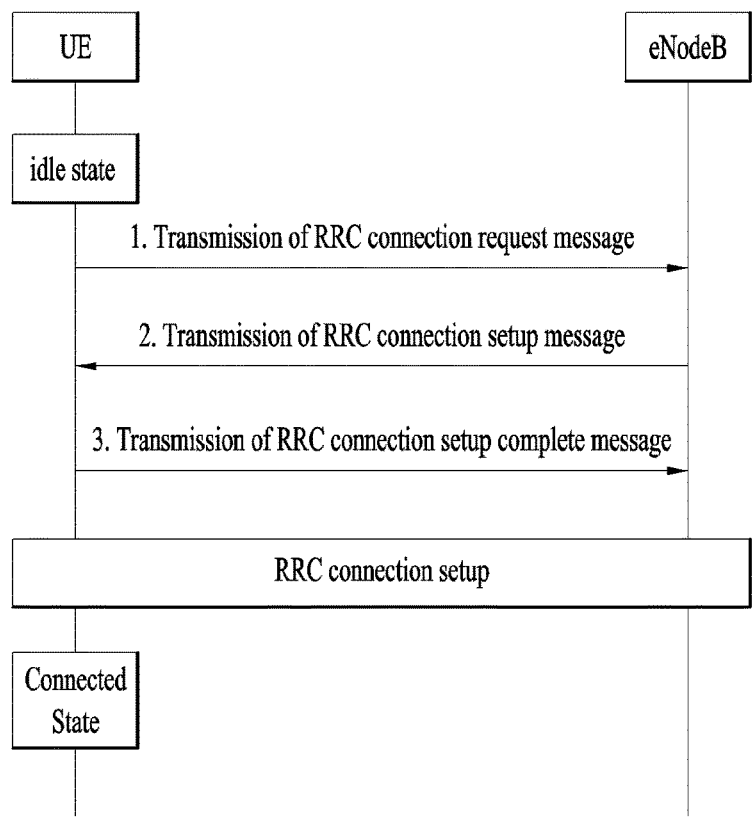
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. Connection of WLAN and EPC

Figure 7:
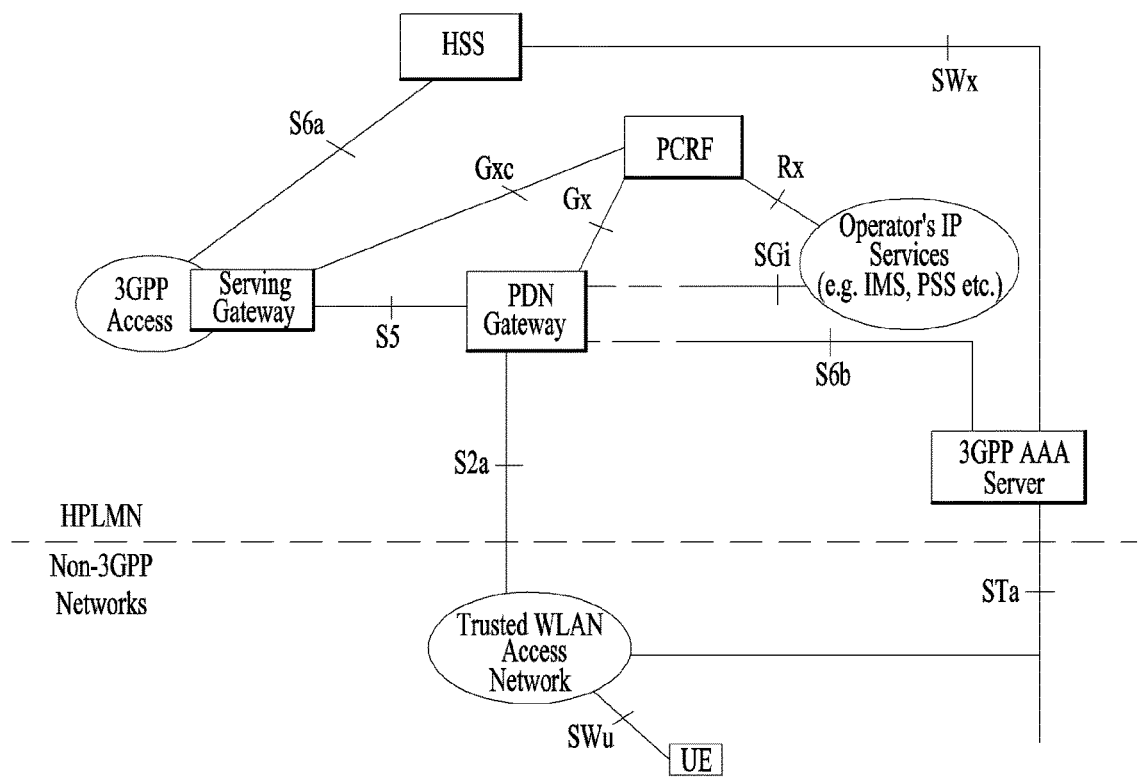
FIGS. 7 and 8 illustrates an example of a structure of a WLAN connected to an EPC.
Figure 8:
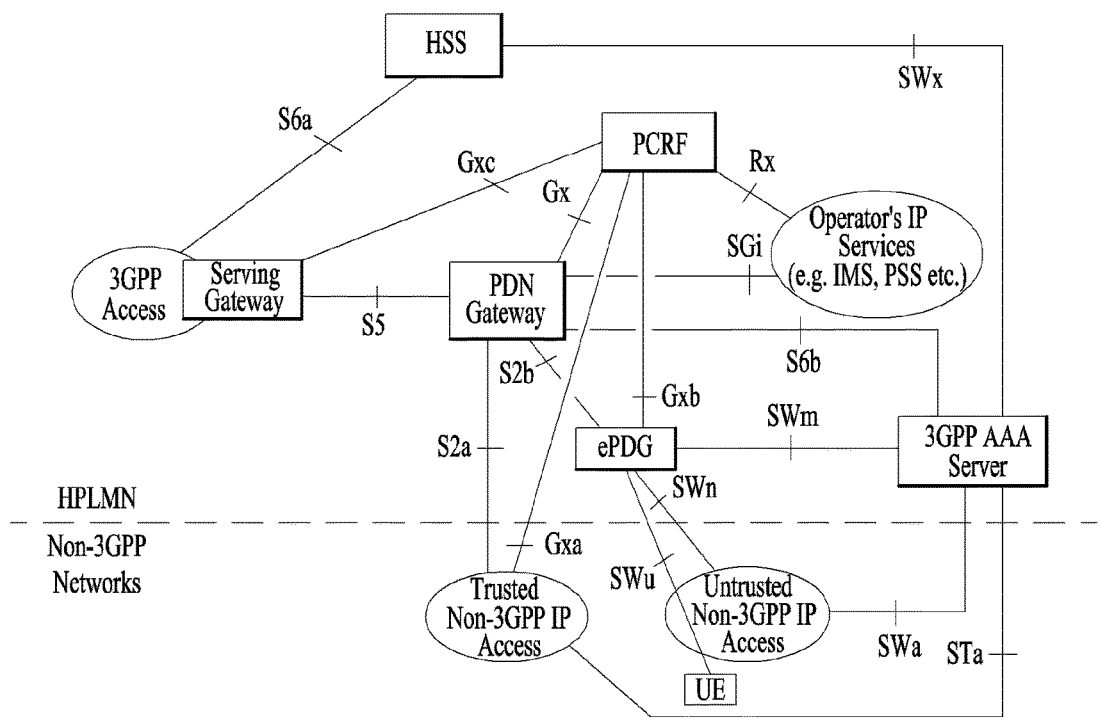

FIGS. 7 and 8 illustrate an architecture for connecting a WLAN to an EPC. Specifically, FIG. 7 illustrates an architecture in which a WLAN is connected to a P-GW through an S2a interface (see 3GPP TS 23.402). As can be seen with reference to FIG. 7, a WLAN access network (in particular, it is a trusted WLAN access network since the S2a interface is an interface for connecting a trusted non-3GPP access to the EPC) is connected to the P-GW through the S2a interface. The content disclosed in TS 23.402 is incorporated herein by reference for an architecture for a trusted WLAN access network (TWAN).

FIG. 8 illustrates an architecture in which a WLAN is connected to a P-GW through an S2b interface. As can be seen with reference to FIG. 8, a WLAN access network (in particular, it is an untrusted WLAN access network since the S2b interface is an interface for connecting an untrusted non-3GPP access to the EPC) is connected to the P-GW through an evolved packet data gateway (ePDG) connected to the P-GW through the S2b interface. Hereinafter, a trusted WLAN and an untrusted WLAN may be both referred to as a WLAN.

2.1 IFOM

Data of a UE may be offloaded to the WLAN access through a 3GPP access. A technology such as IP flow mobility and seamless offload (IFOM), multi access PDN connectivity (MAPCON), or the like has been proposed to support a multiple radio access. The MAPCON technology is a technology of transmitting data by using a 3GPP access and a Wi-Fi access through respective PDN connections. The IFOM technology is a technology of transmitting data by aggregating the 3GPP access and the Wi-Fi access to one PDN or P-GW.

Figure 9:
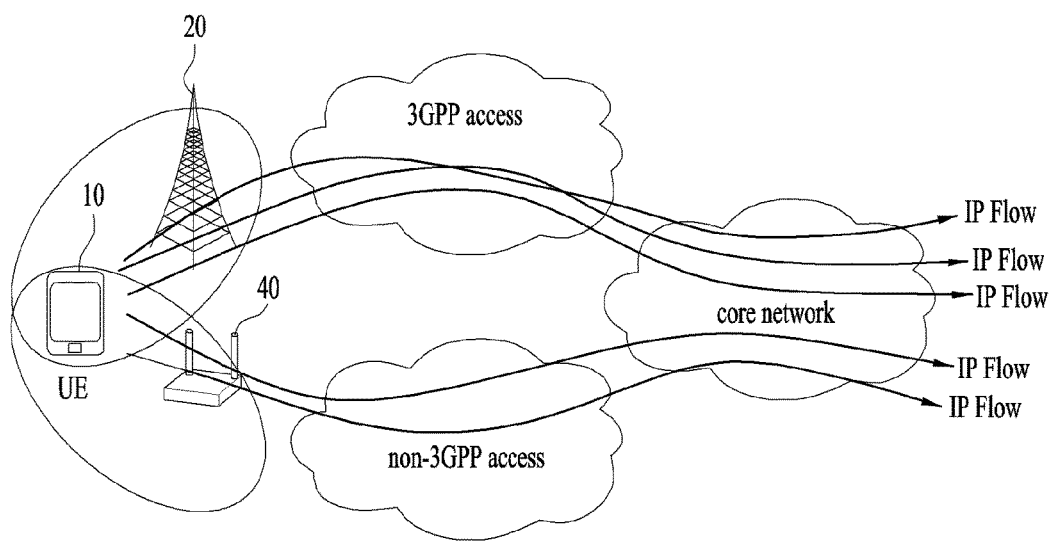
FIG. 9 is an exemplary view illustrating an example of IFOM (IP Flow Mobility) technology.

FIG. 9 is an exemplary view of the IFOM technology. Referring to FIG. 9, the IFOM technology is to provide the same PDN connection through several pieces of different accesses. Such IFOM technology provides seamless transmission and reception through offloading onto a WLAN. Furthermore, the IFOM technology provides the transfer of IP flows having the same one PDN connection from one access to the other access. As described above, with the help of the technologies capable of offloading the traffic of UE onto a WLAN, the congestion of a cellular access of a mobile communication service provider can be reduced.

The provider provides a policy to the UE in order to divert the traffic onto the WLAN access and the UE may divert its data onto the wireless LAN in accordance with the policy. For provision of the policy to the UE, a 3GPP based access network discovery and selection function (ANDSF) may provide a policy associated with the wireless LAN.

Figure 10:
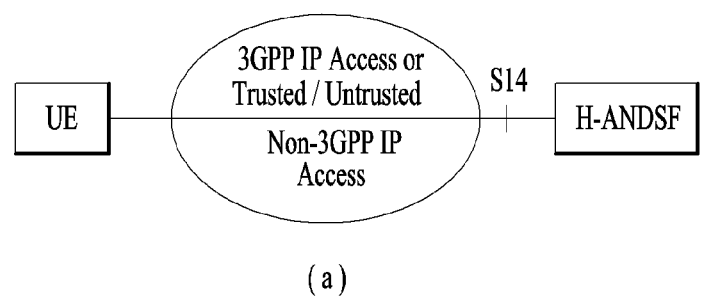
FIGS. 10(a) and 10(b) illustrate a network control entity for access network selection.
Figure 10:
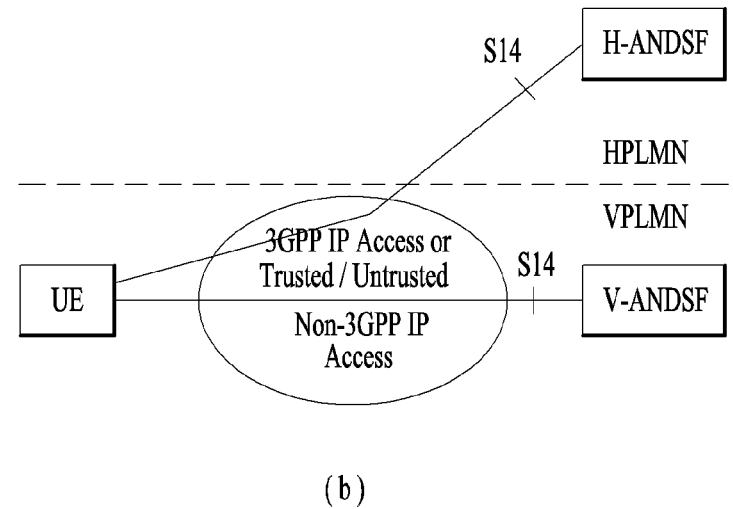

FIGS. 10(a) and 10(b) illustrate network control entities for selecting an access network. Referring to FIG. 10(a), the ANDSF may be present in the home network (Home Public Land Mobile Network ('HPLMN')) of the UE. Furthermore, referring to FIG. 10(b), the ANDSF may also be present in the Visited Public Land Mobile Network (VPLMN) of the UE. When the ANDSF is present in the home network as described above, it may be called an H-ANDSF. When the ANDSF is present in the visited network, it may be called a V-ANDSF. The ANDSF is used to include the H-ANDSF and/or the V-ANDSF. The ANDSF can provide information on an inter-system movement policy (ISMP), information for access network search and information on inter-system routing policy (ISRP), for example, a routing rule.

2.2 TWAN (Trusted Wireless Access Network)

Figure 11:
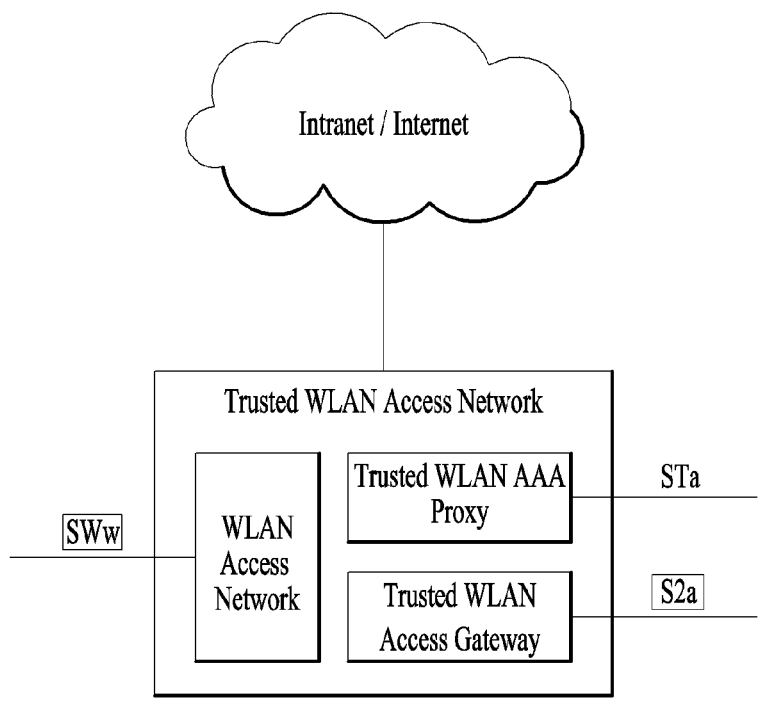
FIG. 11 is a diagram illustrating a structure of a TWAN (Trusted Wireless Access Network).

FIG. 11 is a diagram illustrating a structure of a TWAN (Trusted Wireless Access Network). As shown in FIG. 11, the TWAN is implemented in such a manner that respective entities for performing each function are separated from each other. The respective entities implemented to be separated from each other are connected with another network node through their respective interfaces different from each other. For example, a TWAG (Trusted WLAN Access Gateway) is connected to the EPC through interface S2a, and a TWAP (Trusted WLAN AAA Proxy) is connected with an AAA (Authentication Authorization Accounting) server through interface Sta.

2. 3 WLAN Connection Mode

If WLAN access procedure is performed through interface S2a, any one of TSCM (Transparent Single Connection Mode), SCM (Single Connection Mode) and MCM (Multiple Connection Mode) is selected in accordance with capabilities of a UE and a network. In the TSCM and the SCM, the UE and the network may be operated using the existing WLAN-AP as it is but may simultaneously use only one PDN connection. On the other hand, in the MCM, WLCP (WLAN Control Protocol) should additionally be supported for the existing WLAN-AP. Likewise, this is equally applied to the UE. In the MCM, it is advantageous that several PDCN connections may be configured at the same time.

Figure 12:
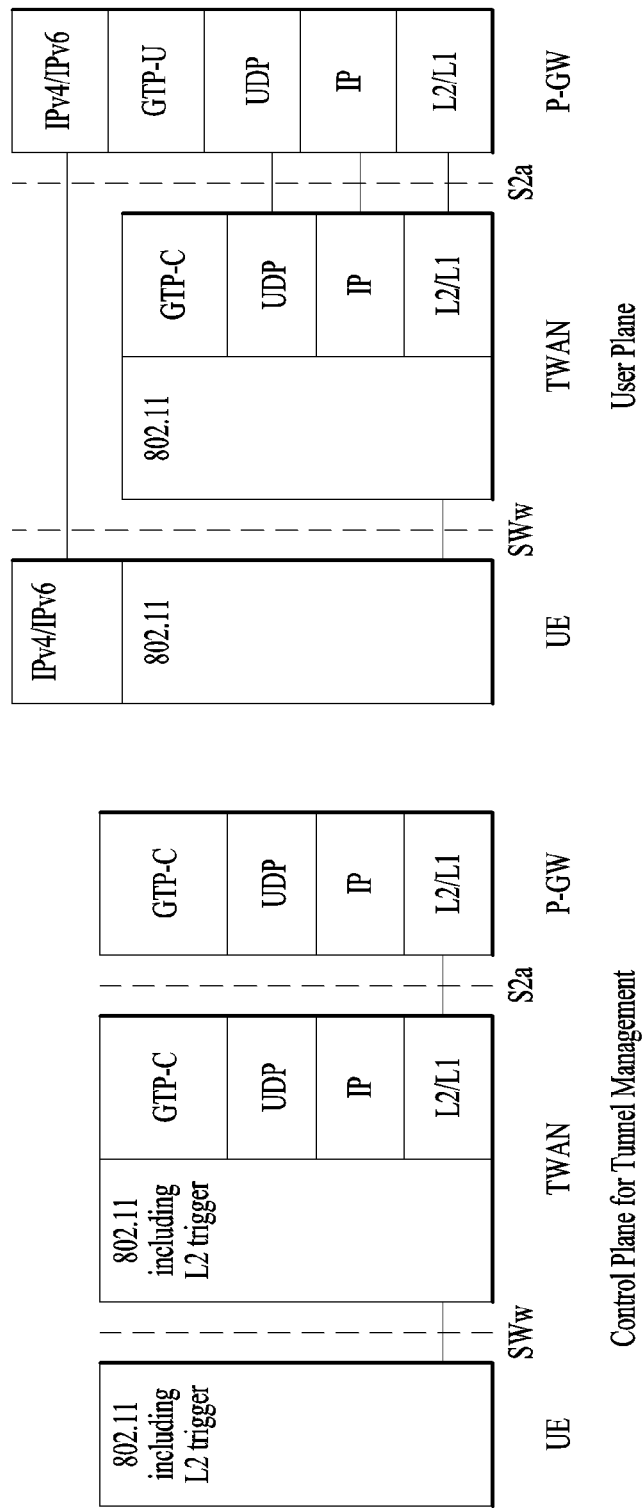
FIG. 12 illustrates a protocol stack between a UE and a TWAN, which operate in a single connection mode (SCM).
Figure 13:
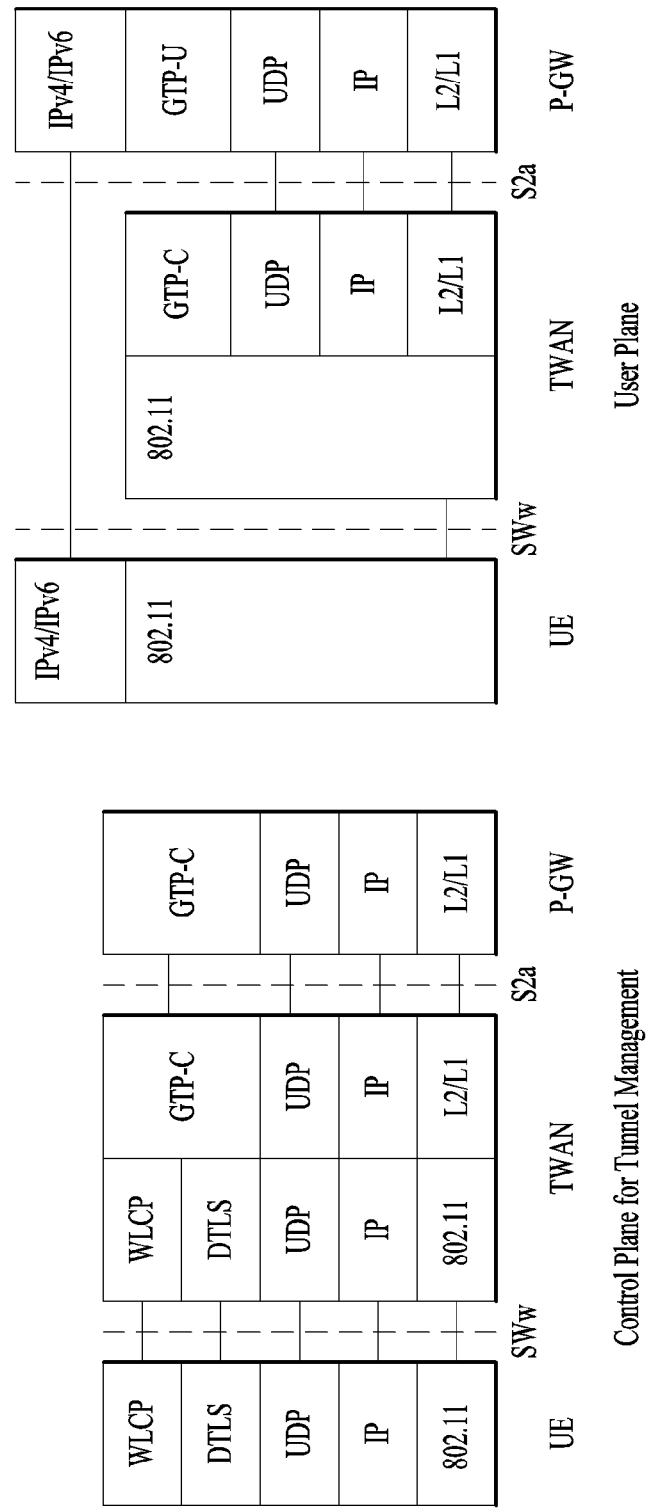
FIG. 13 illustrates a protocol stack between a UE and a TWAN, which operate in a multiple connection mode (MCM).

FIG. 12 illustrates a protocol stack between a UE and a TWAN, which operate in a single connection mode (SCM). FIG. 13 illustrates a protocol stack between a UE and a TWAN, which operate in a multiple connection mode (MCM). As shown in FIG. 13, the MCM may be operated only if a WLCP should be supported for both the UE and the TWAN unlike FIG. 12. If the WLCP is supported for any one of the UE and the TWAN, the TSCM or the SCM is operated.

Figure 14:
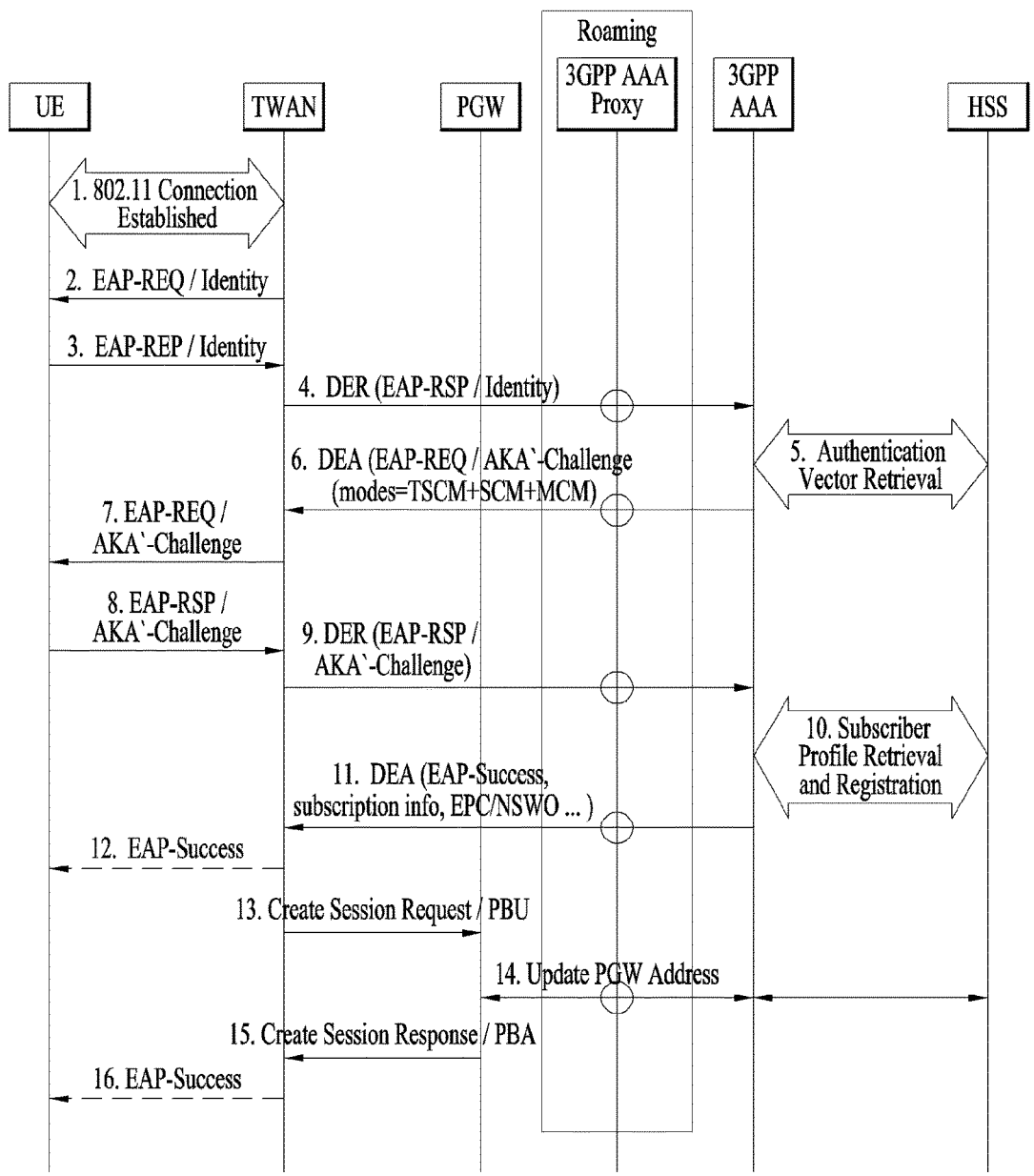
FIG. 14 illustrates a TWAN initial access procedure of a UE operating in a transparent SCM (TSCM).
Figure 15:
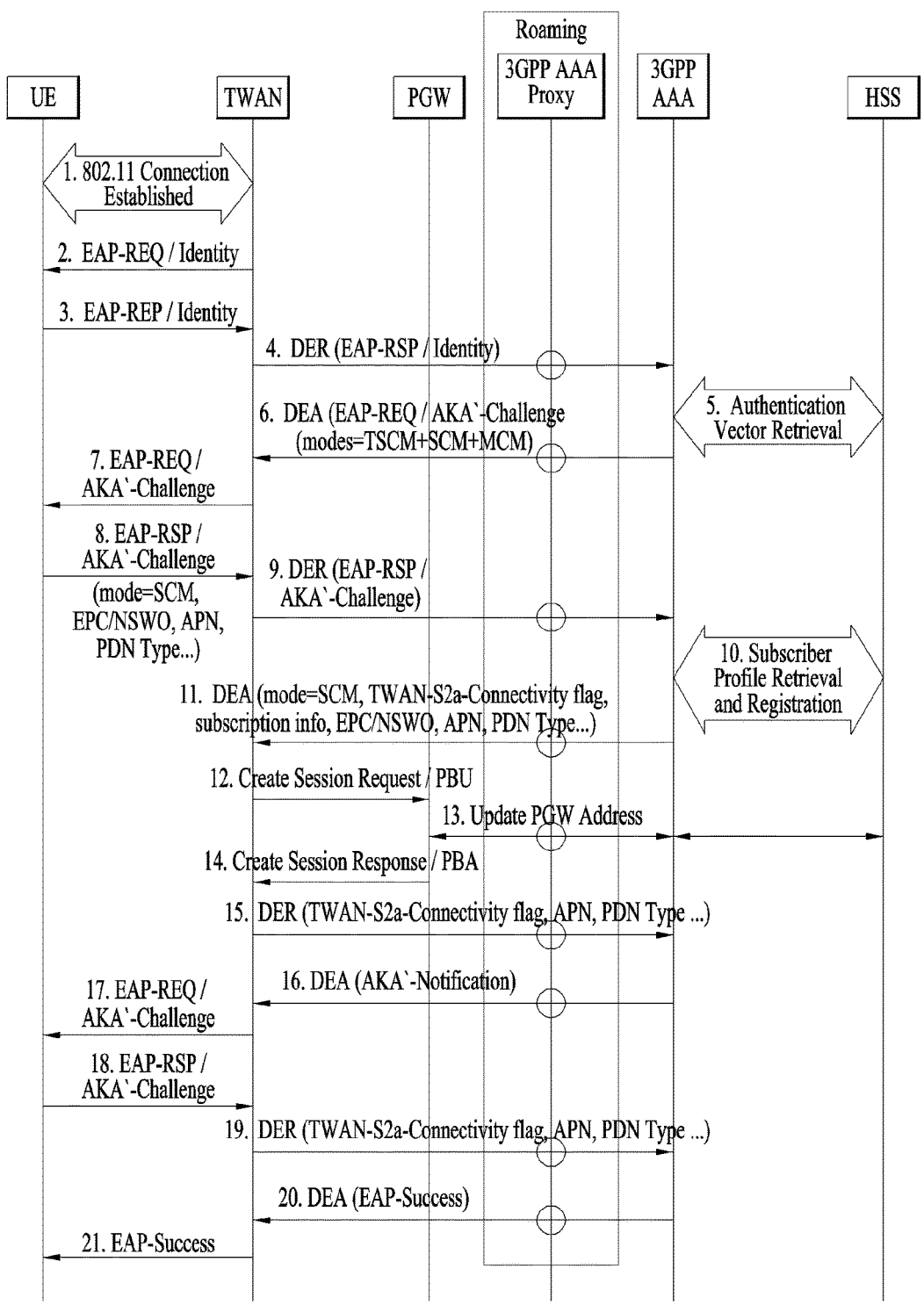
FIG. 15 illustrates a TWAN initial access procedure of a UE operating in an SCM.

Hereinafter, FIGS. 14 and 15 illustrate a TWAN initial access procedure of a UE operating in a transparent SCM (TSCM) and an SCM. FIG. 14 illustrates a case of the TSCM, and FIG. 15 illustrates a case of the SCM.

Figure 16:
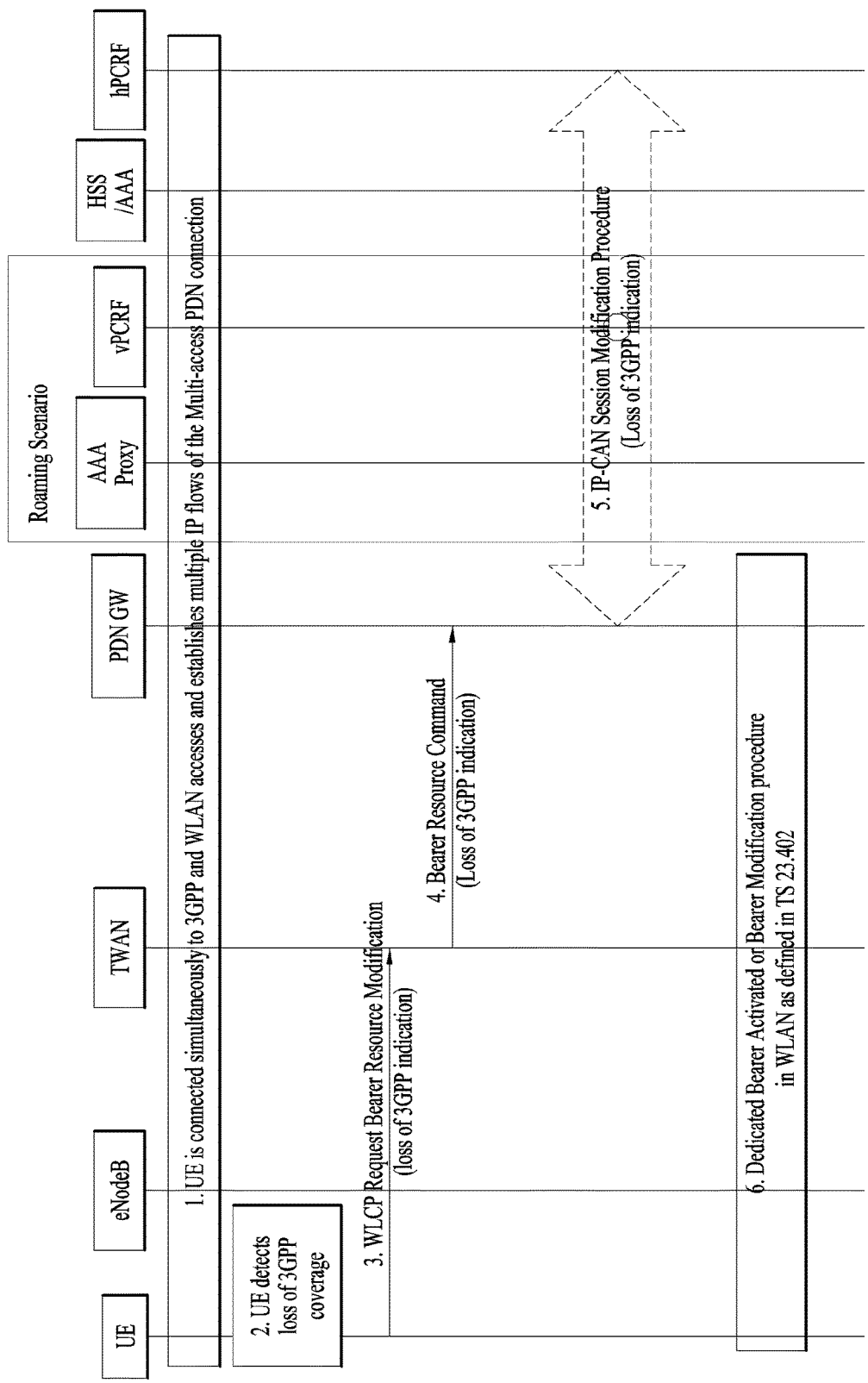
FIG. 16 illustrates a procedure of processing 3GPP access loss in a UE operating in MCM.

Referring to FIG. 15, a UE operating in the SCM initially attaches to the TWAN through an initial attach and authentication & authorization procedure. In the step of performing a series of authentication and authorization procedures shown in FIG. 15, PDN connection is generated between the UE and the PGW through steps 12 and 14. In FIG. 16, a signaling for generating PDN connection between the TWAN and the PGW is omitted from FIG. 15, and the authentication & authorization procedure is only shown.

On the other hand, a UE operating in the TSCM in accordance with FIG. 14 does not transmit any information for generating PDN connection to the network unlike the UE operating in the SCM, and FIG. 14 is identical to FIG. 15 in that PDN connection is generated between the UE and the PGW.

2.4 Access Loss

Figure 17:
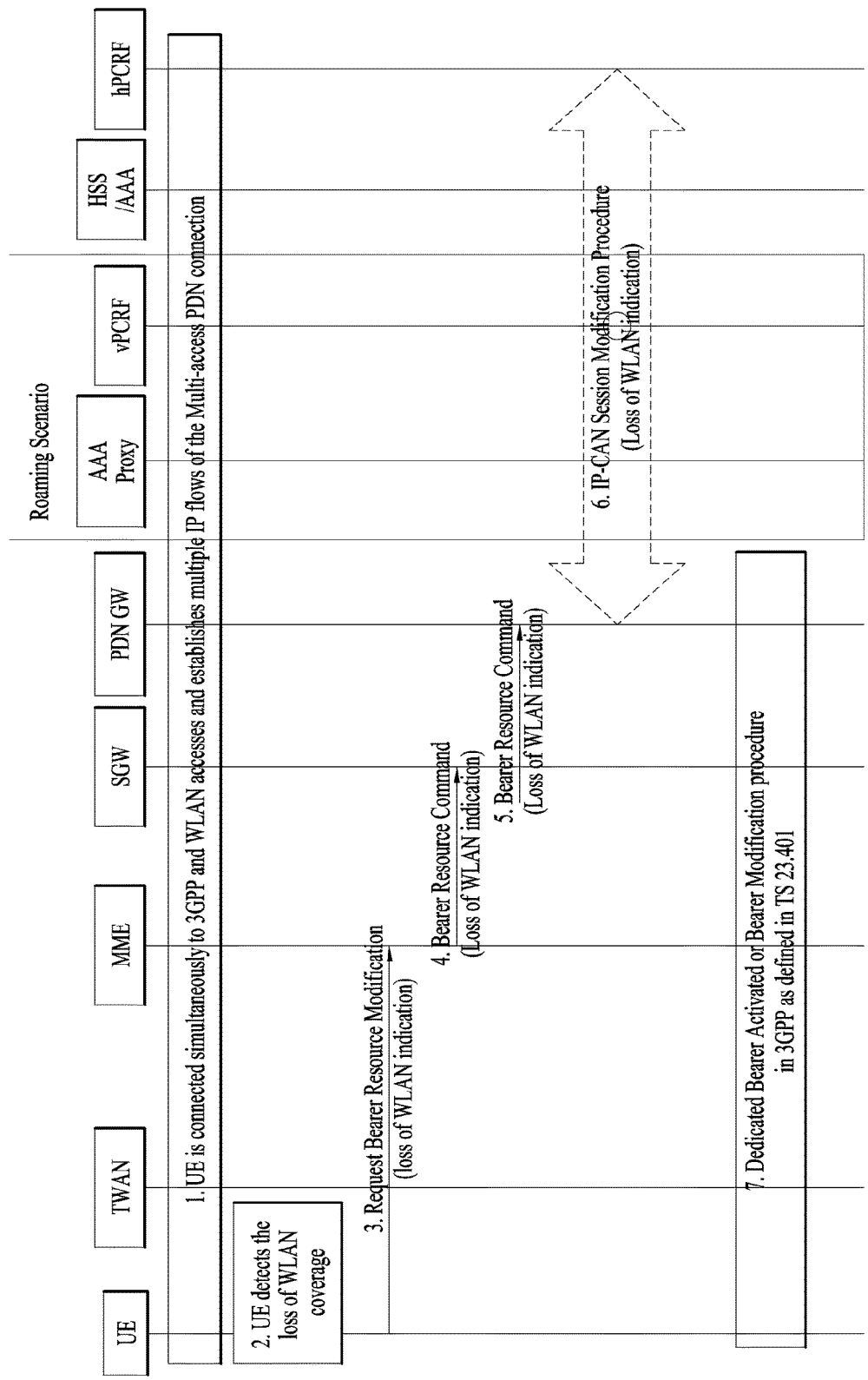
FIG. 17 illustrates a procedure of processing WLAN access loss.

FIGS. 16 and 17 respectively illustrate a procedure of processing 3GPP access loss and a procedure of processing WLAN access loss.

If access loss for a 3GPP network is generated for a UE which is simultaneously accessing a 3GPP network and a WLAN, the UE notifies that access loss for the 3GPP network is generated through access to the WLAN (FIG. 16). The access loss is notified to a policy and charging rule function (PCRF) through the PGW, and as the PGW and the PCRF recognize the access loss, the PGW and the PCRF do not transmit data to the 3GPP network where the access loss is generated, any more. If a routing rule is accepted, data to the UE is transmitted through another access network (WLAN) not the 3GPP access network.

On the other hand, if access loss for a WLAN is generated for a UE, the UE notifies that access loss for the WLAN is generated through access to the 3GPP network (FIG. 17). The access loss is notified to the PGW and the PCRF in the same manner as FIG. 16, and the PGW and the PCRF do not transmit data to the WLAN where the access loss is generated, any more. If a routing rule is accepted, data to the UE is transmitted to through the 3GPP access network.

3. Suggested Embodiment 1

As described above, if the access loss of the 3GPP network is generated, the UE notifies the TWAN of the access loss of the 3GPP network through the WLAN by using the WLCP. The TWAN delivers the access loss of the 3GPP network to the PGW. However, unlike the MCM, the WLCP is not supported if the WLAN is operating in the SCM (or TSCM). Therefore, in case of the UE operating in the SCM, even though the access loss of the 3GPP network is generated, a problem occurs in that there is no path for notifying the PGW of the access loss.

Also, if the access loss of the 3GPP network is generated, data already transmitted to eNB and TWAN before the PGW identifies the access loss of the 3GPP network are not delivered to the UE due to the access loss. Therefore, there is no method for again transmitting data transmitted after the access loss of the 3GPP network is generated, a problem occurs in that some data are not received.

Figure 22:
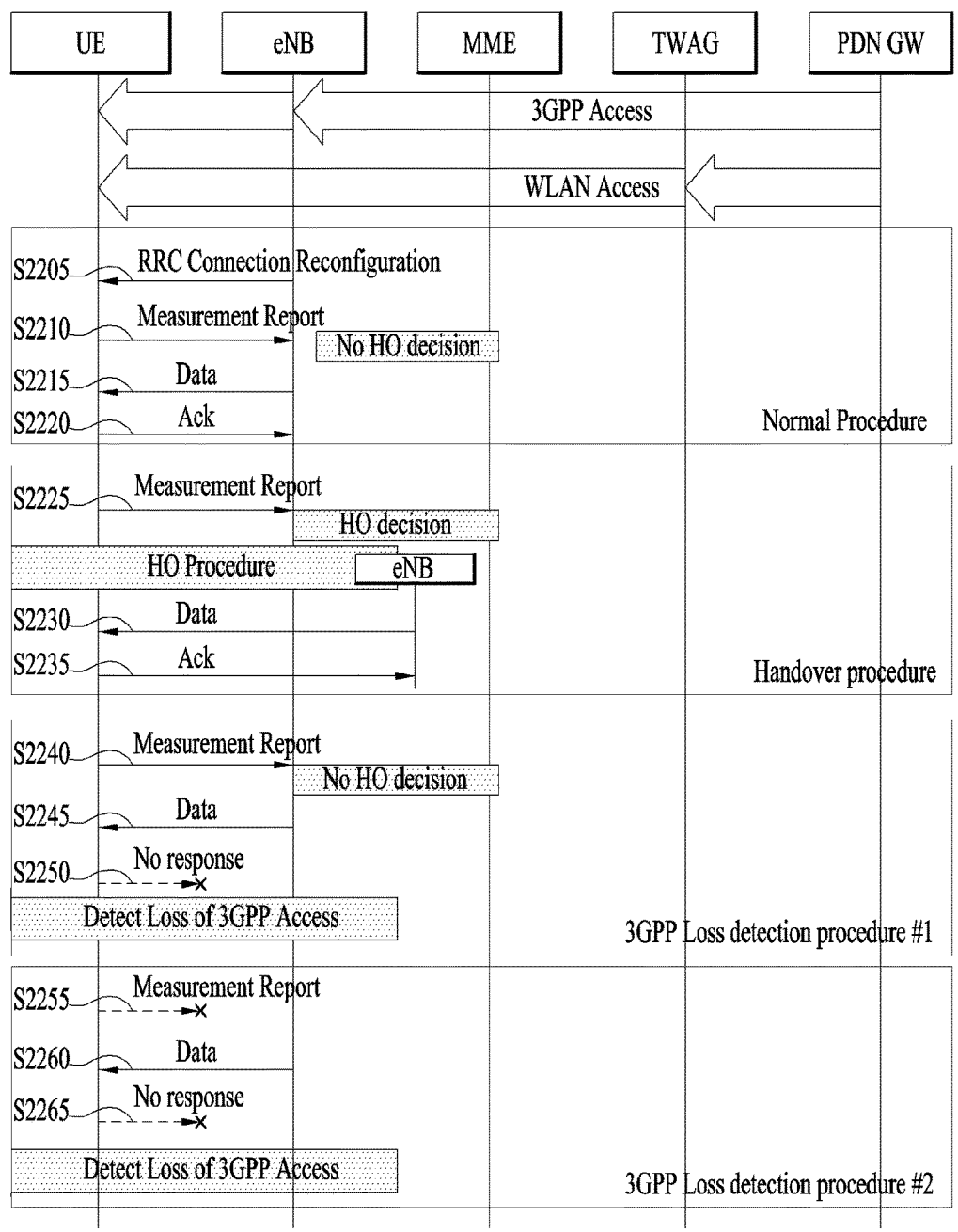
FIG. 22 is a diagram illustrating an example of a procedure of processing 3GPP access loss when the 3GPP access loss is sensed.
Figure 23:
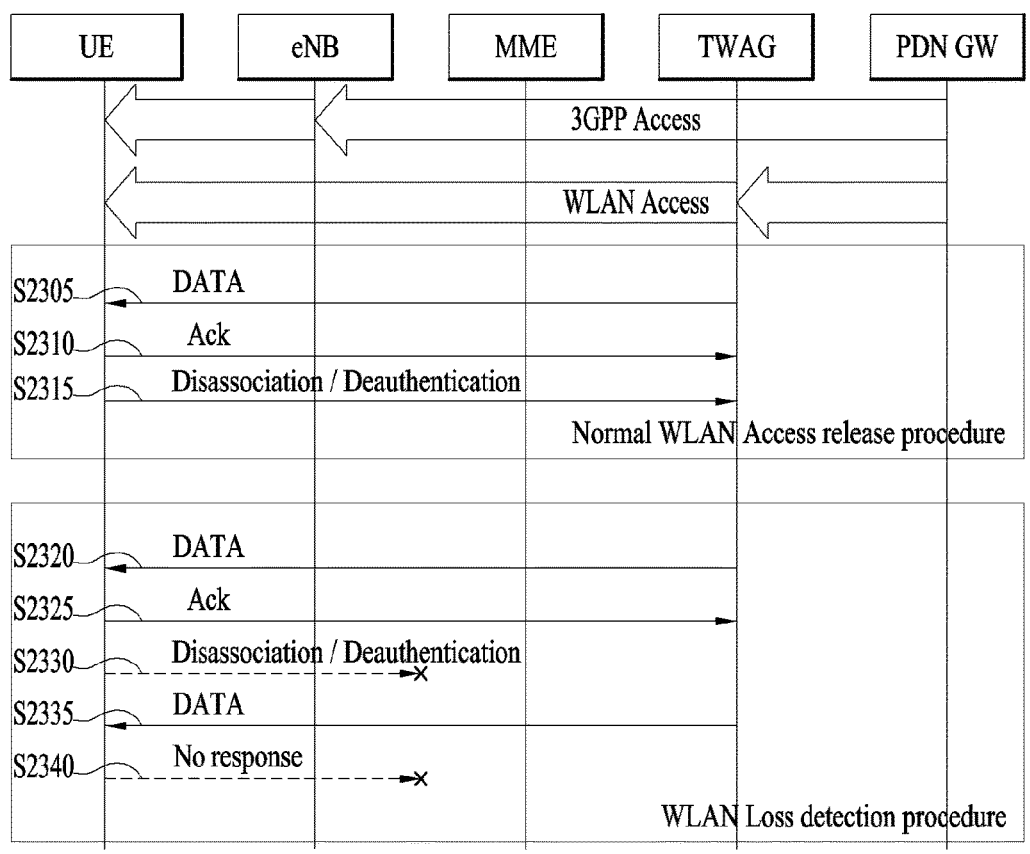
FIG. 23 is a diagram illustrating an example of a procedure of processing WLAN access loss when the WLAN access loss is sensed.

Hereinafter, a method for sensing and processing access loss of a 3GPP network or WLAN when the access loss is generated for a UE operating in an SCM (or TSCM) will be suggested. FIG. 22 illustrates an example of a procedure of processing 3GPP access loss when the 3GPP access loss is sensed, and FIG. 23 illustrates an example of a procedure of processing WLAN access loss when the WLAN access loss is sensed. First of all, the example of the 3GPP access loss will be described with reference to FIG. 22.

For application of the aforementioned NBIFOM, the UE should configure a plurality of PDN connections through access to both the 3GPP network and the WLAN. Therefore, the UE maintains the state of access to the 3GPP network and access to the WLAN. If access loss for the 3GPP network (hereinafter, referred to as 3GPP access loss) or access loss for the WLAN (hereinafter, referred to as WLAN access loss) is generated as the UE is out of coverage of a specific network, this access loss should be notified to the PGW. According to the embodiment suggested below, the 3GPP access loss is sensed by the eNB and then notified to the PGW.

First of all, if the UE attaches to the eNB, the eNB establishes the UE to perform measurement report during RRC connection reconfiguration (S2205). The eNB determines handover of the UE depending on a channel state of the UE by using the measurement report received from the UE (S2210). If it is determined that handover is not required, the eNB transmits data to the UE (S2215), and receives ACKnowledgement for the data from the UE (S2220). If it is determined that handover is required from the measurement report (S2225), the eNB delivers data of the UE to another eNB to perform data communication between a new eNB and the UE (S2230 and S2235). Hereinafter, a method for enabling eNB to determine whether 3GPP access loss has been generated in a UE, by using the aforementioned handover procedure will be suggested. The eNB determines that 3GPP access loss has been generated in the UE in case of the following two cases.

First of all, the eNB determines that handover is not required after receiving measurement report from the UE (S2240), and transmits data (S2245). However, when the eNB does not receive ACK for the data or any signal from the UE for a predetermined time (S2250), the eNB determines that the 3GPP access loss has been generated in the UE. That is, the eNB determines that a channel status of the UE is not bad and thus determines that handover to another eNB is not required. However, since the eNB does not receive any signal from the UE for a predetermined time, the eNB determines that the UE is subjected to the 3GPP access loss. As signals expected by the eNB to be transmitted from the UE, there may be types of signals for connection recovery in addition to ACK signal.

Secondly, when the eNB transmits data to the UE (S2260) in a state that measurement report is not received from the UE (S2255) but does not receive ACK for the data or any signal from the UE (S2265), the eNB determines that the 3GPP access loss has been generated in the UE.

If the eNB determines the access loss of the UE in accordance with the aforementioned two cases, the eNB transmits information indicating the access loss of the UE to MME. The information indicating the access loss of the UE may be transmitted as being implemented as an access loss indication message, or may be transmitted as being included in another message in the form of a specific indicator.

Subsequently, an example of WLAN access loss will be described with reference to FIG. 23. Access loss of a UE for a TWAN is determined by TWAG. If the access loss is not generated, the TWAG transmits data to the UE and receives ACK (S2305 and S2310). Meanwhile, if the TWAG transmits data to the UE (S2335) in a state that a diassociation/deauthentication message is not received from the UE (S2330) but does not receive ACK signal from the UE for a certain time period (S2340), the TWAG determines that the WLAN access loss has been generated.

Meanwhile, in respect of the 3GPP access loss of FIG. 22, if the eNB determines the access loss in accordance with the aforementioned two methods, it is not possible to identify that the UE recovers connection to the 3GPP network or accesses the 3GPP network through another eNB. In other words, the eNB may determine that the 3GPP access loss has been generated even in the case that the UE accesses another eNB by reason of RLF (Radio Link Failure). Therefore, a problem may occur in that the access loss is notified to the PGW through the MME. In this case, a problem may occur in that the 3GPP access loss is notified to the PGW and therefore the network recognizes that the UE is subjected to the access loss in spite of the fact that the UE actually accesses another eNB. Therefore, a procedure of dropping the 3GPP access loss of the UE will be described. An example that dropping the 3GPP access loss of the UE is processed by the MME and an example that dropping the 3GPP access loss of the UE is processed by the SGW will be described.

Figure 18:
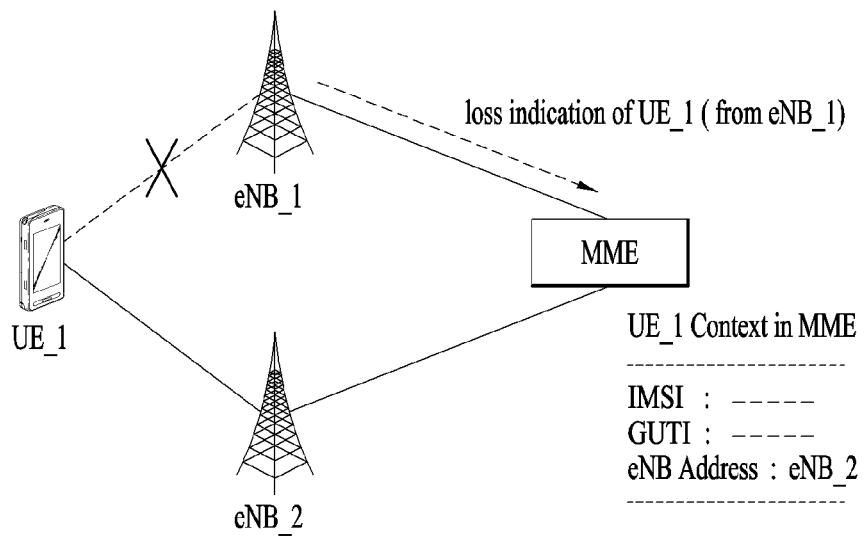
FIG. 18 illustrates an example of a procedure of processing access loss in a network node.
Figure 19:
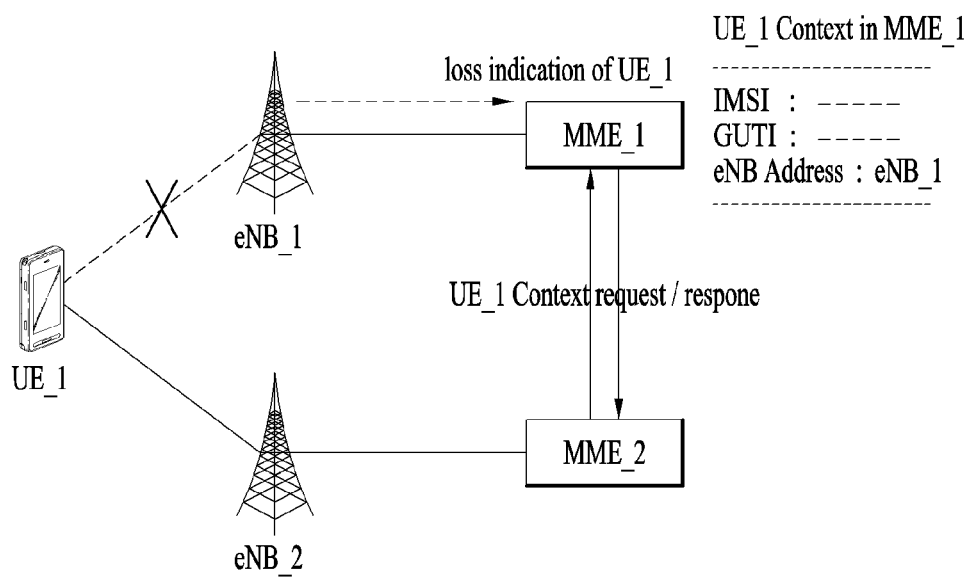
FIG. 19 illustrates another example of a procedure of processing access loss in a network node.
Figure 20:
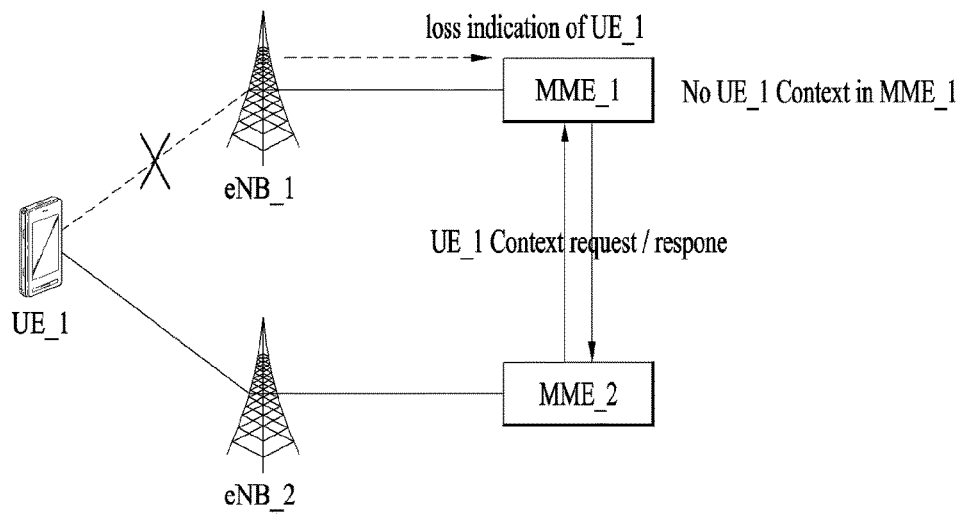
FIG. 20 illustrates other example of a procedure of processing access loss in a network node.

First of all, the procedure of processing access loss through MME of network nodes will be described with reference to FIGS. 18 to 20. If a status described in FIGS. 18 to 20 is generated, the MME drops information on access loss without transmitting the information on access loss to the PGW even though the 3GPP access loss is notified from the eNB. That is, the MME disregards the information on access loss with respect to a case which will be described later, and processes that the access loss of the UE is not generated.

First of all, if the eNB which has transmitted information indicating the access loss of the UE is different from the eNB stored in UE context information of the MME, the MME drops the information on access loss. That is, the MME recognizes that the access loss is not generated in the UE.

Description will be given with reference to the example of FIG. 18, eNB_1 transmits information on access loss of UE_1 to the MME. However, the MME already knows that UE_1 is connected to eNB_2 by context information of UE_1. Therefore, the MME drops the information on access loss, which is received from eNB_1.

Secondly, if context information of the UE, which is owned by the MME, is requested from another MME, the corresponding MME drops the information on access loss. This is because that the MME may know that the access loss has not been generated in the UE if it is recognized that the UE maintains access to another MME through another eNB.

Description will be given with reference to the example of FIG. 19, the UE accesses eNB_2 even though access to eNB_1 is released. The eNB_1 and the eNB_2 are respectively connected to MME_1 and MME_2, and the MME_2 newly connected with the UE requests the MME of context information of the UE, which is owned by the MME_1. Since the MME which has received the request of the context information knows that the UE accesses the eNB_2 even though occurrence of access loss is received from the eNB_1, the MME drops the information on access loss of the UE.

Finally, if the MME does not own context information of the UE, which is subjected to access loss, the MME drops the information on access loss of the UE. That is, the MME disregards the access loss of the UE of which context information is not owned by itself any more.

Description will be given with reference to the example of FIG. 20, cancel location update for the MME_1 may be performed while the UE is newly being connected to the MME_2. This procedure may be understood as a procedure of deleting UE context information which is owned by the MME_1 as the UE will be connected with the MME_2. When the UE is attached through the MME_2, the context information of the UE, which is owned by the MME_1, is already deleted. Therefore, since the MME_1 knows that the UE is attached to another MME even though the information on access loss of the UE is received from the eNB_1, the MME_1 drops the information on access loss of the UE.

Subsequently, the procedure of processing information on access loss of the UE through SGW will be described. If the SGW processes the information on access loss of the UE, the MME may transmit the information on access loss, which is received from the eNB, to the SGW without any determination unlike the description made with reference to FIGS. 18 to 20.

If the MME notifies the SGW of access loss together with identifier (e.g., network ID and/or address of the eNB) of the eNB which has determined the access loss, the SGW processes the access loss on the basis of the identifier of the eNB and the information on the UE, which are included in the information on access loss. In more detail, the SGW identifies S1-U interface of the UE and if eNB set in the S1-U interface of the UE is different from the eNB which has indicated the access loss, the SGW drops the information on access loss. If the eNB set in the S1-U interface is different from the eNB which has indicated the access loss, it means that the UE is currently connected to another eNB different from the eNB which has indicated the access loss. By contrast, the SGW identifies the S1-U interface of the UE and as a result, if eNB set in the S1-U interface is the same as the eNB which has indicated the access loss, the SGW delivers the information on access loss to the PGW.

Meanwhile, according to the method for determining access loss through the SGW, if the SGW connected to the UE is changed, the access loss is delivered to the PGW without being dropped. Therefore, if the information on access loss is received from the SGW, the PGW compares the SGW, which is currently connected with the UE, with the SGW which has indicated the access loss. That is, the PGW drops the information on access loss of the UE if the SGW indicated by the context information of the UE is different from the SGW which has indicated access loss.

Figure 21:
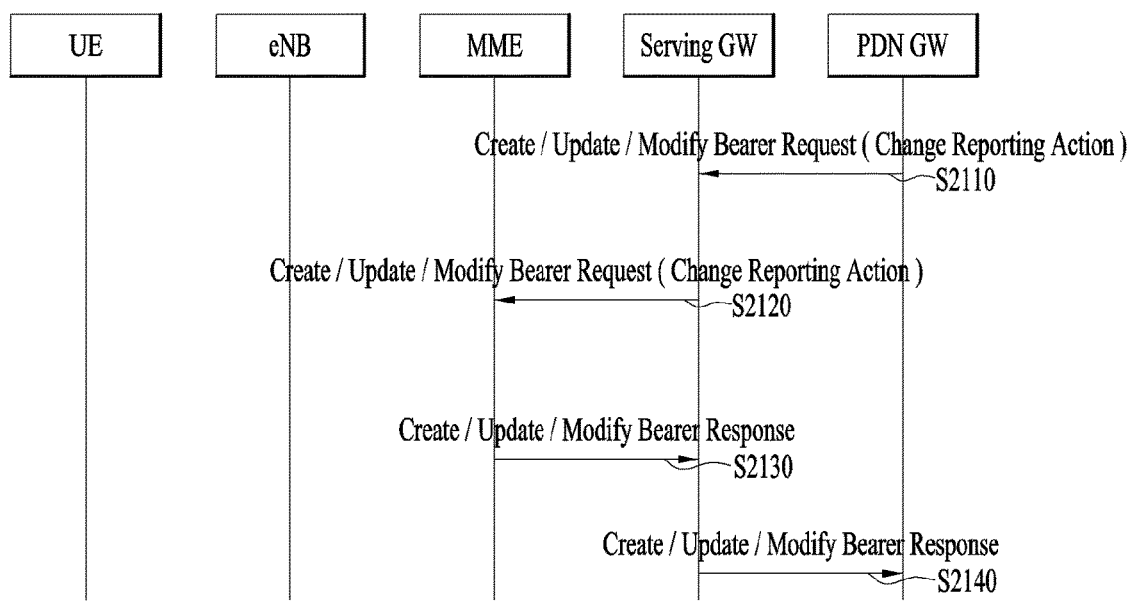
FIG. 21 illustrates a procedure of notifying an MME whether a PDN gateway (PGW) supports a connection mode of a UE and NBIFOM and processing access loss in a specific condition only.

FIG. 21 illustrates a method for processing access loss when MME of network nodes senses the access loss.

As described with reference to FIGS. 18 to 20, if the MME transmits access loss to the PGW after sensing the access loss, signaling overhead may be increased in the network when there are a lot of UEs managed by the MME. To reduce such overhead, the PGW may establish the MME to indicate access loss only if the UE is operating by being attached to the TWAN in the SCM.

The PGW may identify a mode of the UE attached to the TWAN, from a access mode value of a create session request message transmitted from the TWAN. The PGW may establish the MME to report access loss by using a change reporting action information element (IE) included in an update bearer request message only if the UE is attached to the TWAN in the SCM (S2110 and S2120).

The MME may sense access loss for only a UE, which belongs to a specific group, by using subscription information of the UE, and may report the sensed access loss to the SGW and the PGW (S2130 and S2140). On the other hand, the MME may determine whether to report the access loss by disregarding the details configured from the PGW and using only subscription information of the UE. For example, the MME may restrict signaling overhead of the network by reporting access loss to gold class users and provide special users with differentiated services.

Also, to reduce signaling overhead, the MME may report access loss only if PDN connection supporting NBIFOM is generated in the UE. However, since the MME cannot know that PDN connection of the UE is generated to support NBIFOM, the MME may know whether PDN connection supports NBIFOM in accordance with a configuration indicated by the PGW or the UE. If the MME can identify a protocol configuration option (PCO) included in an EPS session management (SM) message, the MME may determine whether PDN connection supports NBIFOM, even though there is no direct notification from the PGW or the UE.

Although FIG. 21 illustrates an example of reporting access loss through the MME, the example of FIG. 21 may similarly be applied to the TWAG. The TWAG may report access loss for only the UE previously set by the PGW. The PGW determines whether final access loss is generated, by using information on access loss, which is received from the TWAG. The PGW may drop the access loss if a connection request is received from the UE through another MME/TWAG within a certain time even though the access loss is reported from the eNB/TWAG.

4. Suggested Embodiment 2

Hereinafter, in addition to the aforementioned procedure of processing access loss, a procedure of processing data transmitted to a UE when access loss is generated will be described. If access loss is generated in the suggested embodiments, loss of data transmitted to the UE may occur.

Figure 24:
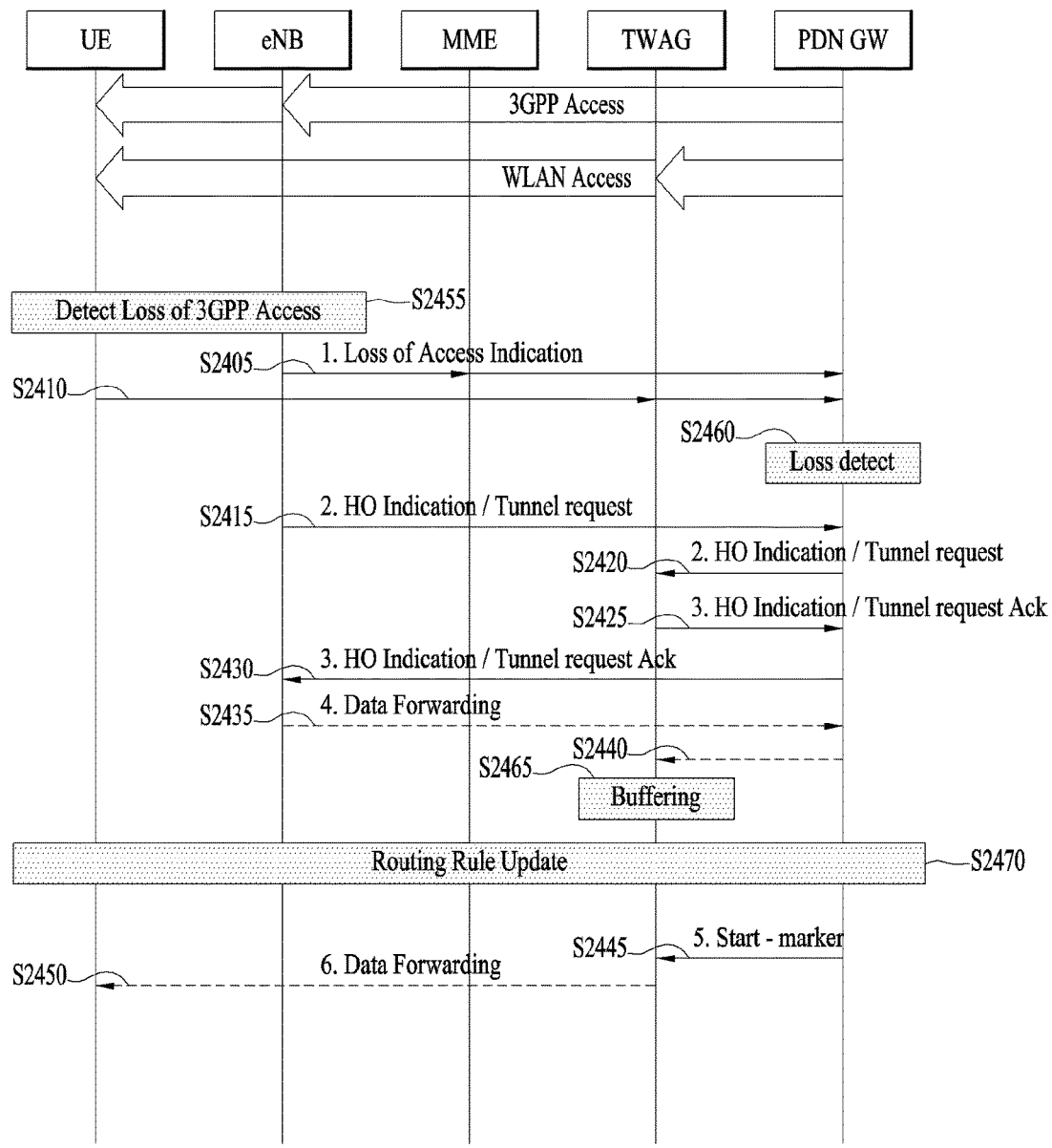
FIG. 24 is a diagram illustrating an example of a method for processing data when 3GPP access loss is sensed.
Figure 25:
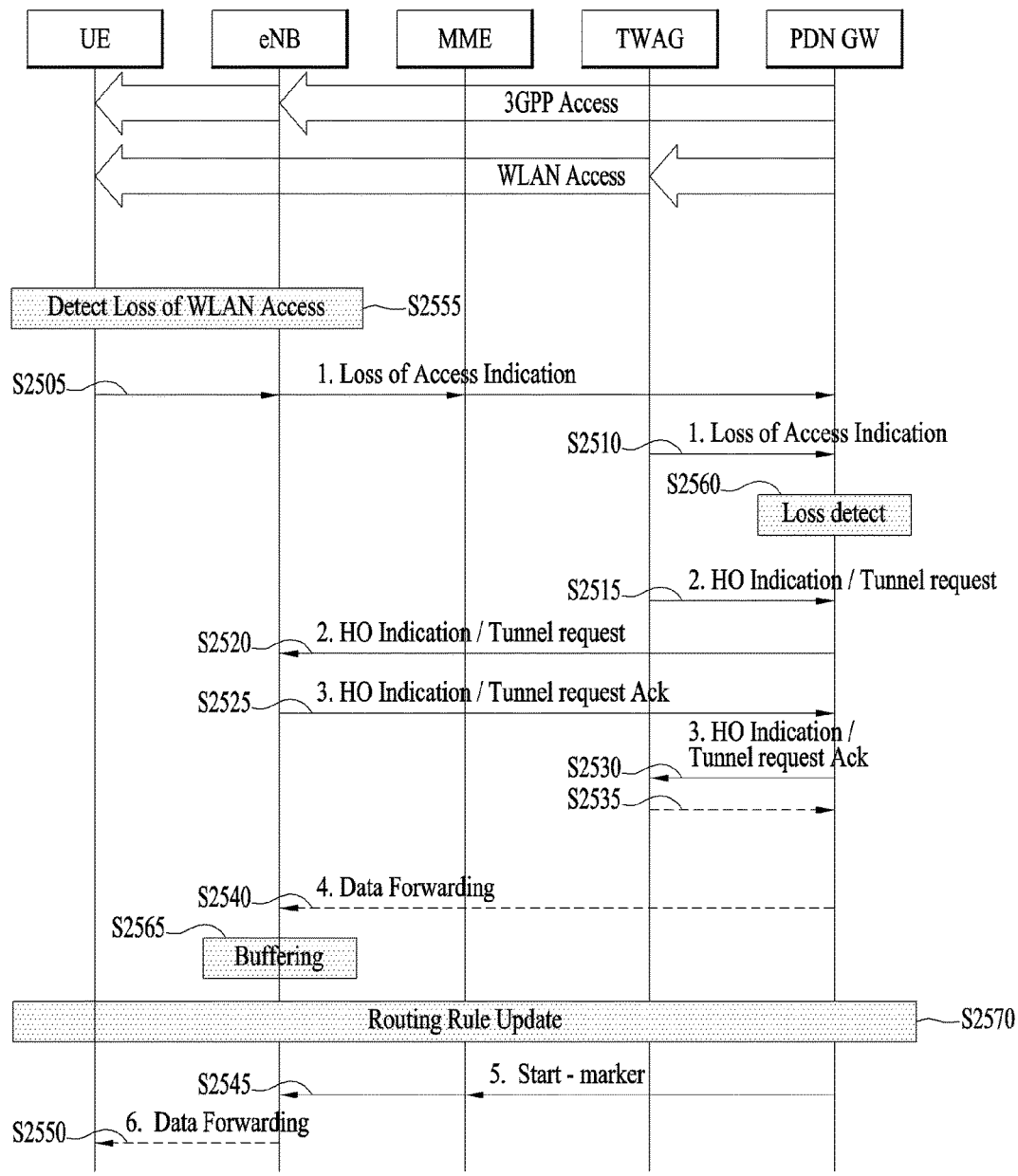
FIG. 25 is a diagram illustrating an example of a method for processing data when WLAN access loss is sensed.

FIG. 24 is a diagram illustrating an example of a method for processing data when 3GPP access loss is sensed, and FIG. 25 is a diagram illustrating an example of a method for processing data when WLAN access loss is sensed.

First of all, if 3GPP access loss is generated in FIG. 24 (S2455), information on 3GPP access loss is transmitted to the PGW through the methods suggested in FIGS. 18 to 23 (S2405 and S2410). Then, the PGW recognizes the 3GPP access loss of the UE (S2460). Subsequently, the eNB which has reported the 3GPP access loss transmits a tunnel request for data transfer to the PGW together with information indicating handover (S2415). The PGW generates a tunnel (S2425) by delivering the information indicating handover and the tunnel request to the TWAG (S2420), and notifies the eNB that the tunnel has been generated successfully by transmitting a tunnel request ACK response to the eNB (S2430).

Subsequently, the eNB delivers all data which are being buffered by itself to transmit them to the UE, to the PGW (S2435). The PGW delivers data, which are available for handover to WLAN, among the data received from the eNB to the TWAG by means of a routing rule previously set by the UE (S2440). The TWAG buffers the delivered data (S2465) and waits for ending of routing rule update. This is because that the routing rule of the UE is not updated yet. If the TWAG transmits data to the UE without waiting for update of the routing rule, ACK/NACK for the corresponding data is transmitted from the UE through the 3GPP network even though the data is successfully transmitted through the WLAN. This is because that the routing rule is not updated yet. If 3GPP access loss is generated, ACK/NACK cannot be transmitted normally. This affects data transmission in a transport layer (for example, TCP (Transmission Control Protocol)) or application layer, whereby more retransmissions and delay time are caused. Therefore, the TWAG should wait for update of the routing rule and then transmit data to the UE, whereby data transmission having no problem may be performed.

The PGW and the UE update the routing rule through the WLAN (S2470). If update of the routing rule is completed, the PGW transmits a start marker for notifying the TWAG that the update has been completed, to the TWAG (S2445), and the TWAG initiates data transmission to the UE (S2450).

The 3GPP access loss according to the aforementioned description may similarly to be applied to even the case of WLAN access loss shown in FIG. 25. That is, if the WLAN access loss is sensed and reported to the PGW (S2555, S2505, S2510 and S2560), the TWAG transmits information indicating handover and a tunnel request to the PGW (S2515), and the PGW requests the eNB of tunnel creation (S2520 and S2525). Subsequently, if the PGW notifies the TWAG that tunnel creation has been completed (S2530), the TWAG delivers data to the eNB (S2535 and S2540). The eNB which has received the data waits for completing update of the routing rule by buffering data transmission (S2565 and S2570). If the PGW notifies the eNB that the update of the routing rule has been completed (S2545), the eNB initiates data transmission to the UE (S2550).

Figure 26:
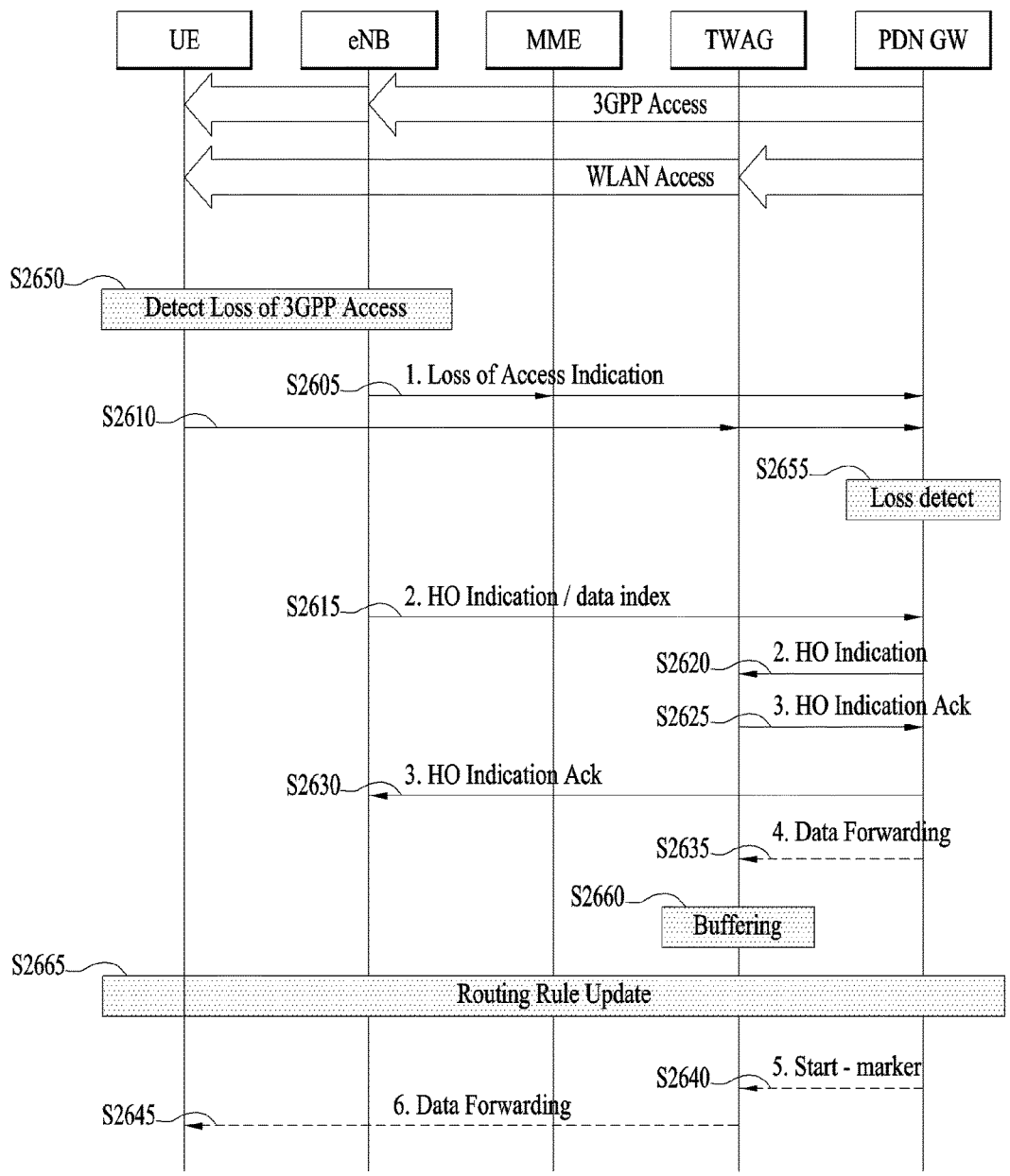
FIG. 26 is a diagram illustrating another example of a method for processing data when 3GPP access loss is sensed.

FIG. 26 is a diagram illustrating another example of a method for processing data when 3GPP access loss is sensed.

According to the embodiment shown in FIG. 26, if occurrence of 3GPP access loss of the UE is notified to the PGW (S2650, S2605, S2610 and S2655), the eNB delivers data index not tunnel request to the PGW together with information indicating handover (S2615). The data index transmitted by the eNB may be a value indicating a position or portion of data completely transmitted to the UE through the 3GPP network. That is, the eNB may allow the PGW to directly transmit the data, which are being buffered, to the UE, by notifying the PGW of the portion of the data completely transmitted to the UE before the 3GPP access loss is generated. In other words, the PGW may determine a position from which data should be transmitted to the UE, through the data index value received from the eNB. In the embodiment shown in FIG. 26, instead of generating a tunnel and delivering data from the eNB to the TWAG, a procedure of allowing the PGW to indicate handover to the TWAG (S2620, S2625 and S2630) and delivering data which are being buffered by itself to the TWAG (S2635) is shown. In other words, handover may be performed without new creation of a tunnel. The procedure of allowing the TWAG to wait for update of a routing rule after handover and initiating data transmission if the update of the routing rule is completed is similar to the aforementioned procedure (S2660, S2665, S2640 and S2645). Although the example of the 3GPP access loss is only shown in FIG. 26, the aforementioned procedure may similarly be applied to even the case of WLAN access loss. If only data index is transmitted without creation of a tunnel, the procedure of generating a tunnel between the eNB and the PGW or between the TWAG and the PGW may be omitted. Therefore, it is advantageous that usage of resources between network nodes may be reduced.

5. Device Configurations

Figure 27:
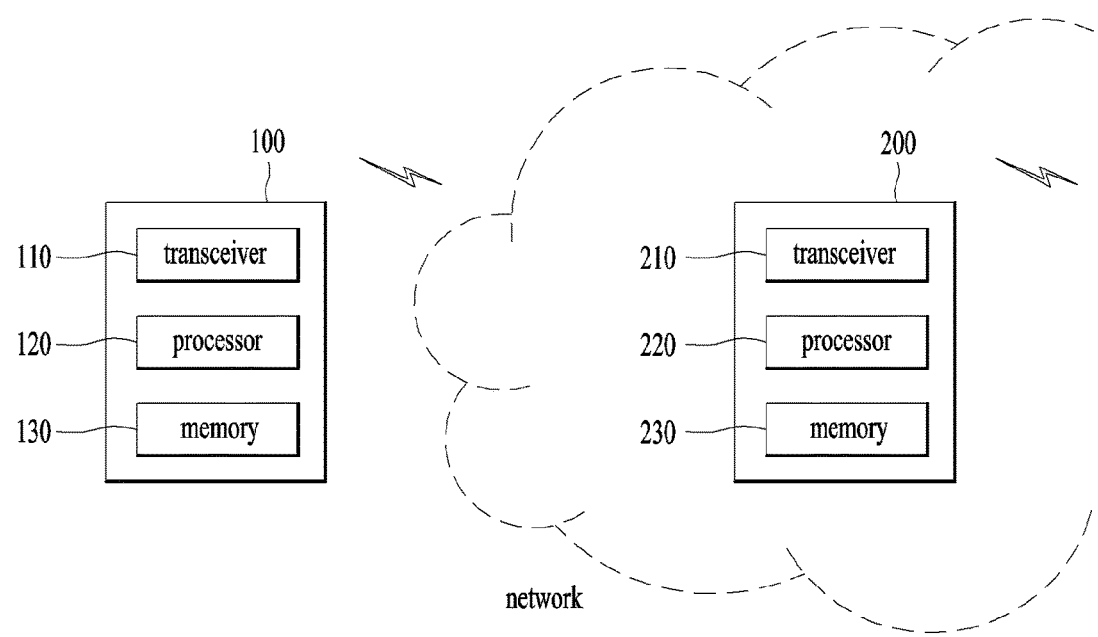
FIG. 27 is a diagram illustrating a configuration of a node device according to the embodiment of the present invention.

FIG. 27 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 27, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned method for processing access loss and the aforementioned method for processing data is applicable to various wireless communication systems that include IEEE 802.16x and 802.11x systems as well as the 3GPP system. Moreover, the suggested method is applicable to mmWave communication system that uses ultrahigh frequency band.

The invention claimed is:

1. A method of processing data by a first network entity operating on a first network for a user equipment (UE) operating in a single connection mode (SCM) or a transparent SCM (TSCM), the method comprising:

transmitting, by the first network entity to a second network entity, first information informing that an access loss of the UE with respect to a second network occurred;

receiving, from the second network entity, second information requesting the first network entity to deliver data of the second network to the UE, operating by accessing the first network and the second network, simultaneously;

receiving, from the second network entity, first data, excluding second data completely transmitted to the UE by a third network entity, operating on the second network, among third data being buffered by the second network entity;

buffering the first data until a routing rule of the UE is updated via the first network;

receiving, from the second network entity, an indicator informing that the routing rule has been completely updated; and transmitting the first data, to the UE, after the indicator is received.

2. The method according to claim 1, wherein, when the second information is a request to generate a tunnel for delivery of the first data of the second network, the first data received from the second network entity are received through the generated tunnel.

3. The method according to claim 1, wherein the first data, received from the second network entity, correspond to data subsequent to a part indicated by an index transmitted from the third network entity to the second network entity among the third data being buffered by the second network entity.

4. The method according to claim 1, wherein the first network is a Wireless Local Area Network (WLAN), the second network is a 3GPP network, the first network entity is a Trusted WLAN Access Gateway (TWAG) operating on the first network, the third network entity is an evolved Node B (eNB) operating on the second network, and the second network entity is a Packet data network GateWay (PGW).

5. The method according to claim 1, wherein the first data, received from the second network entity, is compatible for a handover to the first network, among data being transmitted to the UE by the second network entity.

6. A first network entity operating on a first network and processing data for a user equipment (UE) operating in a single connection mode (SCM) or a transparent SCM (TSCM), the first network entity comprising:

a transmitter;

a receiver; and a processor, operatively coupled to the transmitter and the receiver, wherein the processor is configured to:

control the transmitter, to transmit to a second network entity, first information informing that an access loss of the UE with respect to a second network occurred;

control the receiver to receive, from the second network entity, second information requesting the first network entity to deliver data of the second network to the UE, operating by accessing the first network and the second network, simultaneously;

control the receiver to receive, from the second network entity, first data, excluding second data completely transmitted to the UE by a third network entity, operating on the second network, among third data being buffered by the second network entity;

buffer the first data until a routing rule of the UE is updated via the first network;

control the receiver to receive, from the second network entity, an indicator informing that the routing rule has been completely updated; and control the transmitter to transmit the first data, to the UE, after the indicator is received.

7. The first network entity according to claim 6, wherein, when the second information is a request to generate a tunnel for delivery of the first data of the second network, the first data received from the second network entity are received through the generated tunnel.

8. The first network entity according to claim 6, wherein the first data, received from the second network entity, correspond to data subsequent to a part indicated by an index transmitted from the third network entity to the second network entity among the third data being buffered by the second network entity.

9. The first network entity according to claim 6, wherein the first network is a Wireless Local Area Network (WLAN), the second network is a 3GPP network, the first network entity is a Trusted WLAN Access Gateway (TWAG) operating on the first network, the third network entity is an evolved Node B (eNB) operating on the second network, and the second network entity is a Packet data network GateWay (PGW).

10. The first network entity according to claim 6, wherein the first data, received from the second network entity, is compatible for a handover to the first network, among data being transmitted to the UE by the second network entity.

* * * * *